United States Patent
Comaravelou et al.

(10) Patent No.: US 12,369,134 B2
(45) Date of Patent: Jul. 22, 2025

(54) METHODS AND SYSTEMS FOR OPTIMIZATION OF SIGNALING AND CONNECTION MANAGEMENT IN NON-ACCESS STRATUM

(71) Applicant: Samsung Electronics Co., Ltd., Suwon-si (KR)

(72) Inventors: Sivasankar Comaravelou, Bengaluru (IN); Prasad Basavaraj Dandra, Bengaluru (IN); Shrinithi Andal Tensingh, Bengaluru (IN); Vijay Ganesh Surisetty, Bengaluru (IN); Danish Ehsan Hashmi, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 256 days.

(21) Appl. No.: 17/885,815

(22) Filed: Aug. 11, 2022

(65) Prior Publication Data

US 2023/0051856 A1    Feb. 16, 2023

(30) Foreign Application Priority Data

Aug. 11, 2021   (IN) .............................. 202141036382

(51) Int. Cl.
*H04W 60/00* (2009.01)
*H04W 76/38* (2018.01)
*H04W 88/06* (2009.01)

(52) U.S. Cl.
CPC ........... *H04W 60/00* (2013.01); *H04W 76/38* (2018.02); *H04W 88/06* (2013.01)

(58) Field of Classification Search
CPC ..... H04W 76/30; H04W 60/04; H04W 60/00; H04W 76/27; H04W 48/18;

(Continued)

(56) References Cited

U.S. PATENT DOCUMENTS 9,271,172 B2    2/2016   Kim et al.
10,743,366 B2   8/2020   Choi et al.
(Continued)

FOREIGN PATENT DOCUMENTS

EP   2827645 A1 * 1/2015 ......... H04L 41/0654
GB   2489725 A    10/2012
(Continued)

OTHER PUBLICATIONS

IN Office Action dated Mar. 31, 2023 for corresponding IN Patent Application No. 202141036382.
(Continued)

*Primary Examiner* — Olumide Ajibade Akonai
(74) *Attorney, Agent, or Firm* — Harness, Dickey & Pierce, P.L.C.

(57) ABSTRACT

A method is provided for completing a registration procedure in a fifth generation (5G) network, comprising transmitting, by a user equipment (UE), a registration request message to the 5G network, the registration request message initiating a first registration procedure, starting, by the UE, a connection release timer in response to occurrence of a plurality of events; meeting, by the UE, at least one of a plurality of conditions; stopping, by the UE, the connection release timer in response to the meeting the at least one of the plurality of conditions; and performing, by the UE, a local release of a signaling connection in response to the meeting the at least one of the plurality of conditions if the UE is in a connected state.

20 Claims, 20 Drawing Sheets

(58) Field of Classification Search
CPC ... H04W 68/005; H04W 76/10; H04W 76/38; H04W 76/34; H04W 76/18; H04W 76/36; H04W 76/19; H04W 84/042; H04W 76/32; H04W 60/06; H04W 88/06; H04W 72/02; H04W 24/02; H04W 76/25; H04W 24/04

See application file for complete search history.

(56) References Cited

U.S. PATENT DOCUMENTS

| | | | |
|---|---|---|---|
| 10,855,720 B2 | 12/2020 | Kumar et al. | |
| 2008/0089272 A1* | 4/2008 | Ahokangas | H04W 48/18 370/328 |
| 2014/0295824 A1* | 10/2014 | Madasamy | H04W 52/0258 455/435.2 |
| 2014/0295838 A1* | 10/2014 | Won | H04W 60/00 455/435.1 |
| 2019/0045423 A1* | 2/2019 | Kumar | H04W 68/005 |
| 2021/0258857 A1* | 8/2021 | Won | H04W 48/18 |
| 2022/0264511 A1* | 8/2022 | Lee | H04W 68/005 |

FOREIGN PATENT DOCUMENTS

| | | | | |
|---|---|---|---|---|
| WO | WO-2020-154736 A1 | | 7/2020 | |
| WO | WO-2020165492 A1 | * | 8/2020 | ........... H04L 63/205 |

OTHER PUBLICATIONS

3GPP TS 23.122 V17.1.0 (Dec. 2020).
3GPP TS 23.287 V16.5.0 (Dec. 2020).
3GPP TS 24.501 V17.1.0 (Dec. 2020).
EESR dated Dec. 23, 2022 for corresponding EP Patent Application No. 22189968.5.
Samsung: "Condition to stop timer T3540", 3GPP Draft; CP-210117, 3rd Generation Partnership Project (3GPP), Mobile Competence Centre; 650, Route Des Lucioles; F-06921 Sophia-Antipolis Cedex; France, vol. CT WG1, no. Electronic meeting; Feb. 25, 2021-Mar. 5, 2021, Mar. 22, 2021, XP051989976.
ZTE et al: "5GMM Cause #62", 3GPP Draft; CP-193104, 3rd Generation Partnership Project (3GPP), Mobile Competence Centre; 650, Route Des Lucioles; F-06921 Sophia-Antipolis Cedex; France, vol. CT WG1, no. Portoroz (Slovenia); Oct. 7, 2019-Oct. 11, 2019, Dec. 2, 2019, XP051833715.

* cited by examiner

METHODS AND SYSTEMS FOR OPTIMIZATION OF SIGNALING AND CONNECTION MANAGEMENT IN NON-ACCESS STRATUM

CROSS REFERENCE TO RELATED APPLICATION

This application is based on and derives the benefit of Indian Provisional Application 202141036382, filed on Aug. 11, 2021 in the Indian Patent Office, the contents of which are incorporated herein by reference.

TECHNICAL FIELD

Embodiments disclosed herein relate to wireless communication networks, and more particularly to optimization or improvement of signaling and connection management in non-access stratum in wireless communication networks.

BACKGROUND

There are various scenarios in non-access stratum (NAS) signaling where inefficiencies may be present, such as, but not limited to, a delay in registration of a user equipment (UE), hogging of resources like power, and lack of service recovery. An example of such a scenario is where a registration procedure for a UE may not be completed because of a transmission failure of a registration complete message or when the UE moves to a new tracking area identity (TAI) when the registration is in progress. As a result, any subsequent registration procedure may be delayed due to a connection release timer, such as T3540, starting after the UE receives a registration accept message, and only upon expiry of the connection release timer is the UE able to initiate signaling.

SUMMARY

Accordingly, embodiments herein provide methods and systems for optimizing or improving signaling and connection management in NAS. A method for completing a registration procedure in the fifth generation (5G) network includes transmitting, by a user equipment (UE), a registration request message to the 5G network, the registration request message initiating a first registration procedure, starting, by the UE, a connection release timer in response to occurrence of a plurality of events, the plurality of events including receiving, by the UE, a first registration accept message from the 5G network, the registration accept message not including pending slice selection assistance information, the registration request message not including a pending follow-on request, the registration request message does not include an uplink data status information element (IE), or the registration request message includes the uplink data status IE and a second registration accept message received by the UE from the 5G network indicates that no user plane resources of protocol data unit (PDU) sessions are to be re-established, the registration request message does not include an allowed PDU session status IE, the registration request message includes the allowed PDU status IE which indicates there are no PDU sessions for which the UE has allowed the user plane resources to be re-established over access, or the allowed PDU session status IE in the registration request message is included by the UE and a third registration accept message received by the UE from the 5G network does not indicate that user plane resources of PDU sessions are to be re-established, the transmitting the registration request message is performed while the UE is in 5G mobility management (5GMM)-idle mode, first user plane resources for first PDU sessions are not set up, and the UE is configured to perform vehicle to everything (V2X) communication without requesting resources for the V2X communication over a reference point; meeting, by the UE, at least one of a plurality of conditions, the plurality of conditions including transmission failure of a registration complete message from the UE to the 5G network, movement of the UE to a new tracking area before the completion of the first registration procedure, and movement of the UE to a new tracking area that is not in a registered tracking area identity (TAI) list; stopping, by the UE, the connection release timer in response to the meeting the at least one of the plurality of conditions; and performing, by the UE, a local release of a signaling connection in response to the meeting the at least one of the plurality of conditions if the UE is in a connected state.

The UE may be a dual sim dual standby (DSDS) device with two subscriber identity module application toolkits (STKs), one of the two STKs being registered with the 5G network; and the transmitting the registration request message may transmit the registration request message via the STK registered with the 5G network.

A method disclosed herein for completing a tracking area update (TAU) procedure in a fourth generation (LTE) network. The method includes transmitting, by a user equipment (UE), a TAU request message to the 4G network, the TAU request message initiating a first registration procedure, starting, by the UE, a connection release timer in response to occurrence of a plurality of events, the plurality of events including a TAU accept message that is received does not include a UE radio capability identity deletion indication information element (IE), the TAU request message does not include a signaling active flag, an active flag, or a flag indicating that the 4G network is going to maintain connection, the first registration procedure is initiated while the UE is in 4G mobility management (EMM)-idle mode, and one or more user plane resources for one or more radio bearers are not set up, meeting, by the UE, at least one of a plurality of conditions, the plurality of conditions including transmission failure of a TAU complete message from the UE to the 4G network, movement of the UE to a new tracking area before the completion of the first registration procedure, and movement of the UE to a new tracking area that is not available in a registered tracking area identity (TAI) list, stopping, by the UE, the connection release timer in response to the meeting the at least one of the plurality of conditions, performing, by the UE, a local release of a signaling connection in response to the meeting the at least one of the plurality of conditions if the UE is in a connected state, and initiating, by the UE, another TAU request message after establishment of a radio connection and the stopping the connection release timer.

A method disclosed herein for completing a registration procedure. The method includes transmitting, by a user equipment (UE), a service request message to the 5G network, the service request message initiating a first service request procedure, starting, by the UE, a connection release timer in response to occurrence of a plurality of events, the plurality of events including receiving, by the UE, a first service accept message from the 5G network, a service type information element (IE) is not set for signaling or high priority access in the service request message, the an uplink data status IE is not included in the service request message, or the uplink data status IE is included in the service request message and a second service accept message received by the UE from the 5G network indicates that no user plane resources of a protocol data unit (PDU) session are to be re-established, the service request message does not include an allowed PDU sessions status IE, the service request message includes the allowed PDU sessions status IE which indicates that there are no PDU sessions for which the UE has allowed the user plane resources to be re-established over access, or the service request message includes the allowed PDU sessions status IE and the service accept message does not indicate that user plane resources of PDU sessions are to be re-established, the transmitting the service request message is performed while the UE is in 5G mobility management (5GMM)-idle mode, first user plane resources for first PDU sessions have not been set up, and the UE is configured to perform vehicle to everything (V2X) communication without requesting resources for the V2X communication over a reference point, meeting, by the UE, at least one of a plurality of conditions, the plurality of conditions including changing of a cell to a new tracking area, the new tracking area not being present in a registered tracking area identity (TAI) list due to a handover, and a data radio bearer not being established by a radio access network, stopping, by the UE, the connection release timer in response to the meeting the at least one of the plurality of conditions, and initiating, by the UE, signaling in response to the meeting the at least one of the plurality of conditions.

The UE may be a dual sim dual standby (DSDS) device with two subscriber identity module application toolkits (STKs), one of the two STKs being registered with the 5G network, and the transmitting the service request message may transmit the service request message via STK registered with the 5G network.

A method disclosed herein for locally releasing a signaling connection in a wireless communication network includes receiving, by a user equipment (UE), a configuration update command message from an access and mobility management function (AMF), the configuration update command message including a configuration update indication information element (IE) with a registration request due to a change in a network slice subscription, and starting, by the UE, a connection release timer in response to occurrence of a plurality of events, the plurality of events including the configuration update command message including at least one of new allowed network slice selection assistance information (NSSAI), new configured NSSAI, or a combination of the new allowed NSSAI and the new configured NSSAI, or a network slicing indication IE that indicates a change in a network slice, and no emergency protocol data unit (PDU) sessions having been established irrespective of whether a plurality of user plane resources for one or more PDU sessions have been set up, and locally releasing, by the UE, a signaling connection on expiry of the connection release timer.

The UE may be a dual sim dual standby (DSDS) device with two subscriber identity module application toolkits (STKs), a first STK among the two STKs being registered with a fifth generation (5G) network, the starting the connection release timer may start the connection release timer while the plurality of user plane resources are established for the one or more PDU sessions, and the method may further comprise establishing the plurality of user plane resources for the one or more PDU sessions, transmitting, by the AMF, the configuration update command message to the first STK, activating a second STK among the two STK to process one or more triggered services, while transmitting, by the AMF, a command to release the signaling connection to the first STK, failing, by the first STK, to process the transmitted command by the AMF to release the signaling connection, and activating the first STK for performing the local release of the signaling connection, by the UE, upon expiry of the connection release timer.

A method disclosed herein for performing a local release of a signaling connection upon receiving a mobility registration reject message for a mobility registration procedure including transmitting, by a user equipment (UE), a mobility registration request message to a network, receiving, by the UE, the mobility registration reject message from the network, the mobility registration reject message including an abnormal cause value, starting, by the UE, a first short timer in response to receiving the mobility registration reject message, and performing the local release of the signaling connection upon receiving the mobility registration reject message or expiry of the first short timer. The method may further comprise incrementing a first attempt counter in response to receiving the mobility registration reject message, starting a second short timer in response to the first attempt counter having a value equal to or greater than a first threshold count, and transmitting a new mobility registration request upon expiry of the second short timer.

The UE may be a dual sim dual standby (DSDS) device with two subscriber identity module application toolkits (STKs), a first STK among the two STKs being registered with a fifth generation (5G) network, the transmitting the mobility registration request message may transmit the mobility registration request message to an access and mobility management function (AMF), the receiving the mobility registration reject message may receive the mobility registration reject message from the AMF, and the method may further comprise incrementing a first attempt counter in response to receiving the mobility registration reject message, and performing a local release of the signaling connection upon a value of the first attempt counter becoming equal to or greater than a second threshold count. The method may further comprise starting a second short timer in response to receiving the mobility registration reject message, activating a second STK among the two STKs to process one or more triggered services, and activating the first STK for triggering the mobility registration procedure after the activating the second STK upon the second short timer being stopped or expiring, the mobility registration procedure being performed with release of the signaling connection of the first STK.

The UE may be a dual sim dual standby (DSDS) device with two subscriber identity module application toolkits (STKs), a first STK among the two STKs being registered with a fourth generation (4G) network, and the method may further comprise transmitting, by the UE, an attach request message or a tracking area update (TAU) request message to a mobility management entity (MME), receiving, by the UE, an attach reject message or a TAU reject message having an abnormal cause from the MME, starting, by the UE, the first short timer in response to receiving the attach reject message or the TAU reject message, incrementing a second attempt counter in response to receiving the attach reject message or incrementing a third attempt counter in response to receiving the TAU reject message, and releasing the signaling connection upon a value of the second attempt counter or the third attempt counter becoming equal to or greater than a third threshold count, or after expiry of the first short timer. The method may further comprise activating a second STK among the two STKs to process one or more triggered services, and activating the first STK for triggering an attach procedure or a TAU procedure upon expiry of the first short timer, the attach procedure or the TAU procedure being performed with local release of the signaling connection of the first STK.

Accordingly, embodiments herein provide a system including a fifth generation (5G) network, a fourth generation (4G) network, and a user equipment (UE) configured to perform at least one of transmitting a registration request message to the 5G network, receiving a registration accept message from the 5G network, transmitting a registration complete message to the 5G network, modifying the registration request message to include at least one of: a pending follow-on request, an uplink data status information element (IE), or an allowed protocol data unit (PDU) session status IE, transmitting a service request message to the 5G network, receiving a service accept message from the 5G network, transmitting an attach request message or a tracking area update (TAU) request message to the 4G network, receiving an attach reject message or a TAU reject message from the 4G network, modifying the service request message to include at least one of: a service type IE, an uplink data status IE, or an allowed PDU sessions status IE, receiving a configuration update command message from an access and mobility management function (AMF), or locally releasing a signaling connection if the UE is in a connected state.

These and other aspects of embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of embodiments herein without departing from the spirit thereof, and embodiments herein include all such modifications.

BRIEF DESCRIPTION OF FIGURES

Embodiments herein are illustrated in the accompanying drawings, throughout which like reference letters indicate corresponding parts in the various figures. Embodiments herein will be better understood from the following description with reference to the drawings, in which.

DETAILED DESCRIPTION

Figure 1:
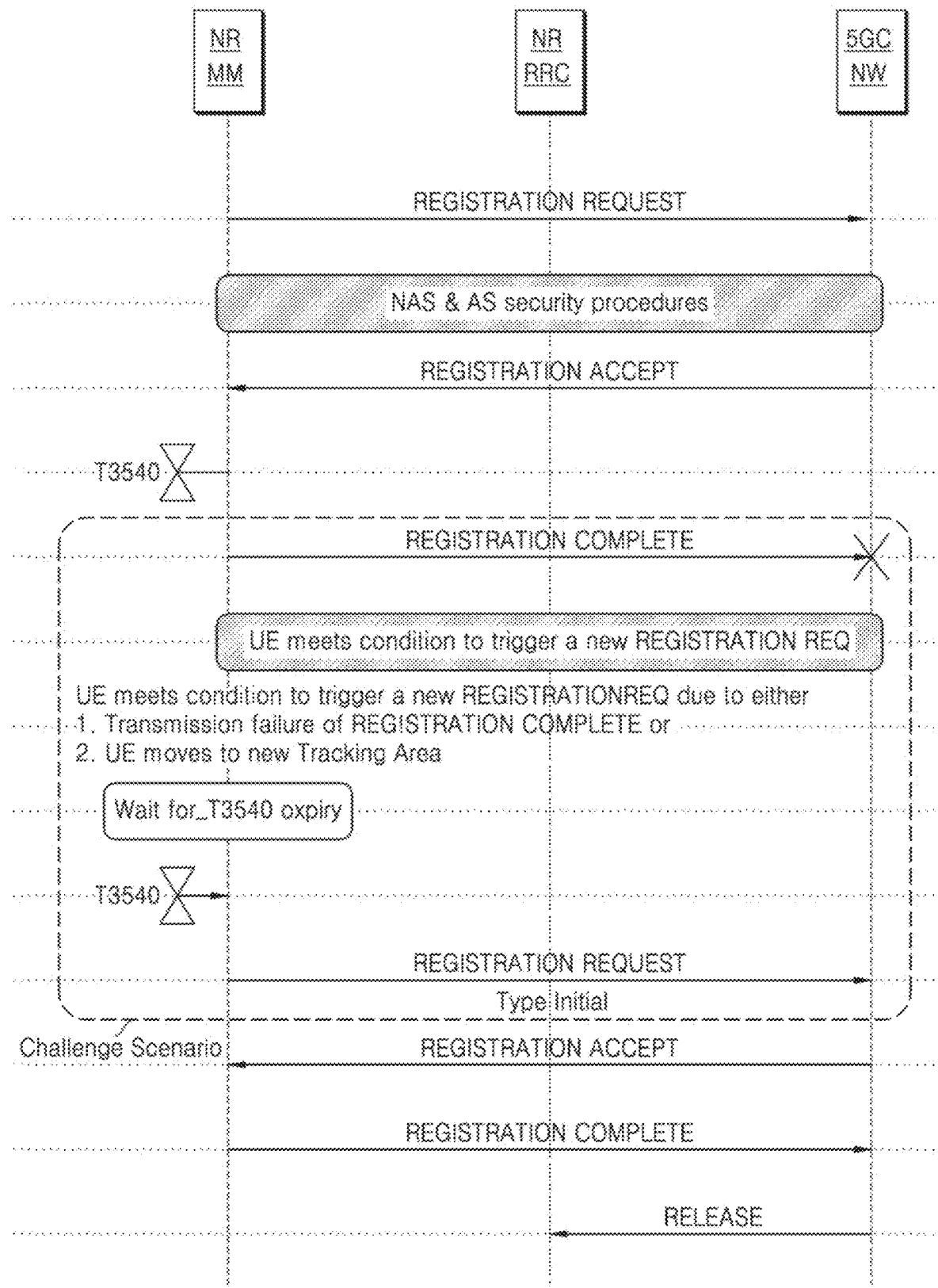
FIG. 1 illustrates a challenge scenario where a UE, upon a transmission failure of a registration complete message due to a TAI change, is unable to perform a registration procedure until expiry of a timer.

Scenario 1 Challenge: Completing a Registration Procedure in the 5G Network Upon Transmission Failure of the Registration Complete Message FIG. 1 illustrates a challenge scenario where a UE is not able to perform a registration procedure until expiry of a timer. The UE (e.g., a new radio UE (NR MM)) may transmit (e.g., via NR radio resource control (RRC) protocol via a wireless network) a registration request message to a fifth generation (5G) network, and upon receiving a registration accept message from the 5G network (following the performance of NAS and AS security procedures), the UE may start a connection release timer, such as T3540, if the following conditions are satisfied:

a. The registration accept message does not include any pending network slice subscription assistance information (NSSAI) information element (IE);
b. The UE has set a follow-on request indicator to "No follow-on request pending" in the registration request message;
c. The UE has not included an uplink (UL) data status IE in the registration request message, or the UE has included the UL data status IE in the registration request message but the registration accept message indicates that no user plane resources of any protocol data unit (PDU) sessions are to be re-established;
d. The UE has not included an allowed PDU session status IE, has included the allowed PDU session status IE indicating that there are no PDU sessions for which the UE has allowed the user plane resources to be re-established over access (an example of this is 3GPP access) in the registration request message, or the UE has included the allowed PDU session status IE in the registration request message but the registration accept message does not indicate that any user plane resources of any PDU sessions are to be re-established;
e. The registration procedure has been initiated in 5G Mobility Management (5GMM)-IDLE mode;
f. The user plane resources for PDU sessions have not been set up; and/or
g. The UE is able to perform vehicle-to-everything (V2X) communication without requesting resources for V2X communication over a reference point.

Upon starting the connection release timer, if there is a transmission failure of a registration complete message from the UE to the 5G network, which may trigger a mobility registration update procedure, or a change of a cell to a new tracking area before the completion of the ongoing registration procedure, the UE is supposed to perform a new or subsequent mobility registration procedure. However, as the connection release timer continues to run, the initiation of the mobility registration update procedure may be affected. Handling of the connection release timer is also not considered, due to which initiation of signaling may not happen until expiry of the connection release timer or release of the signaling connection. This may cause a time delay and resource wastage, as signaling may only be performed after the expiry of the connection release timer. Moreover, if the UE has moved to a different cell and/or tracking area, or if the UE encounters lower layer failures, the UE may not receive a message regarding release of the signaling connection.

Scenario 2 Challenge: Completing a Tracking Area Update (TAU) Procedure when a Connection Release Timer is Running Due to a Previous TAU Procedure In another challenge scenario, the UE may transmit a TAU request message to a fourth generation (4G) network and receive a TAU accept message from the network. The UE may start a connection release timer, an example of which is T3440, upon all of the following events occurring:
a. The UE receives the TAU accept message without a UE radio capability identity deletion indication IE;
b. The UE has not set an "active" flag or a "signaling" flag in the TAU request message;
c. The tracking area updating or combined tracking area updating procedure has been initiated in evolved packet system (EPS) mobility management (EMM)-IDLE mode; and/or
d. One or more user plane resources for one or more radio bearers are not set up.

In other challenge scenarios, the UE may start the connection release timer if it receives a EMM cause value, such as, but not limited to #11, #12, #13, #14, #15, #25, #31 and #35. The UE may also start the connection release timer if the UE receives a detach accept message and the UE has set a detach type to "IMSI detach" in the detach request message, and one or more user plane resources for one or more radio bearers have not been set up.

In another challenge scenario, the UE may start the connection release timer if the UE receives a TAU reject message indicating:
a. Any of the EMM cause values, such as, but not limited to #9 or #10, and the UE has no circuit switched (CS) fallback emergency call, a CS fall back, a CS fallback call, 1×CS fallback emergency call, or 1×CS fallback call pending; or
b. An EMM cause value, such as, but not limited to #40, the TAU update message was not triggered due to receiving a paging for CS fallback or a paging for CS fallback, and the UE has no CS fallback emergency call, CS fallback call, a CS fallback call, 1×CS fallback emergency call, or 1×CS fallback call pending.

In another challenge scenario, the UE may start the connection release timer if the UE receives a service reject message indicating an EMM cause value, such as, but not limited to, #9, #10, or #40, as a response to the service request message, a control plane service request message, or an extended service request message with service type set to "packet services via S1."

In another challenge scenario, the UE may start the connection release timer if the UE receives an EMM cause value, such as, but not limited to #3, #6, #7, or #8, or if it receives an authentication reject message.

In another challenge scenario, the UE may start the connection release timer if the UE receives a service reject message indicating an EMM cause value, such as, but not limited to, #39, and the UE has initiated extended service request in EMM-IDLE and one or more user plane resources for one or more radio bearers have not been set up.

In another challenge scenario, the UE may start the connection release timer if the UE receives a service reject message, a service accept message, an attach accept message, or a TAU accept message with control plane data back-off timer.

However, upon starting the connection release timer, if the cell changes to a new tracking area before the completion of the ongoing TAU procedure or if there is a transmission failure of a TAU complete message, the UE may attempt to reinitiate the TAU procedure immediately or promptly. However, as the connection release timer is still running, the initiation of the TAU procedure may be impacted, as the UE may not be able to initiate the TAU procedure while the connection release timer is running. Similarly, if the UE has moved to a new tracking area that is not in the registered TAI list, the UE may initiate the TAU request or a combined TAU request, however with the connection release timer still running, the initiation of the TAU procedure or the combined TAU procedure may be impacted, as the UE may not be able to initiate any uplink message transmission, except for any emergency-related signaling when the connection release timer is running.

Figure 5:
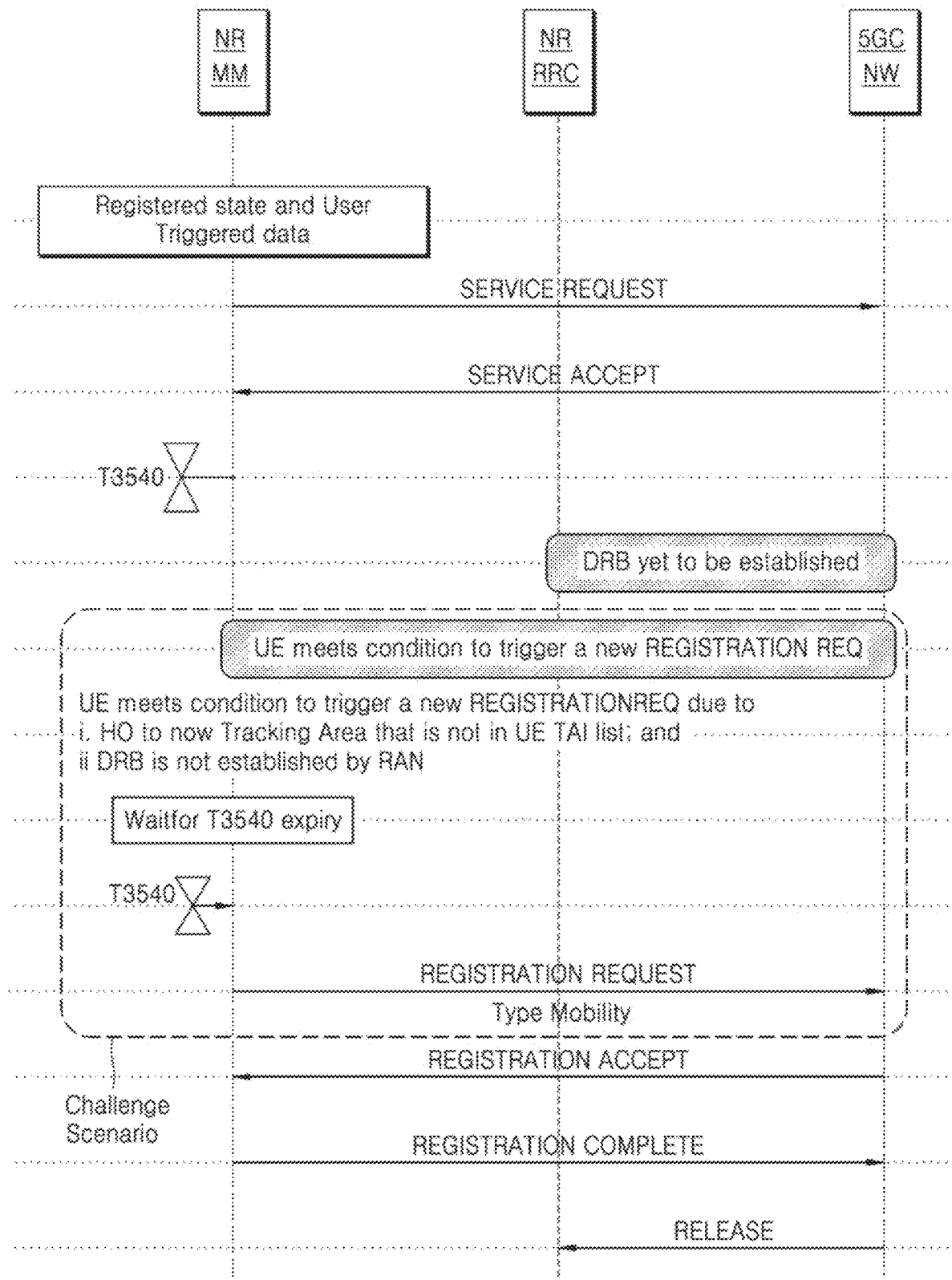
FIG. 5 illustrates a challenge scenario where a UE is unable to perform a mobility registration procedure upon receiving a service accept message and before the establishment of a data radio bearer (DRB)

Scenario 3 Challenge: Completing a Mobility Registration Procedure Upon Receiving a Service Accept Message and Before Establishment of a Data Radio Bearer FIG. 5 illustrates a challenge scenario where a UE is unable to perform a mobility registration procedure upon receiving a service accept message and before the establishment of a data radio bearer (DRB). When the UE (in the registered state) transmits the service request message to the network for initiating a service request, the network may accept the service request and send a service accept message to the UE. One of the conditions for starting the connection release timer, an example of which is T3540, may be the occurrence of the following events:

a. The UE receives the service accept message from the network;
b. The UE did not set the service type IE to "signaling" or "high priority access," the UE has not included the UL data status IE in the service request message, or the UE has included the UL data status IE in the service request message but the service accept message indicates that no user plane resources of any PDU sessions are to be re-established;
c. The UE has not included the allowed PDU session status IE, has included the allowed PDU session status IE indicating there are no PDU sessions for which the UE has allowed the user plane resources to be re-established over access (an example of this access is 3GPP access) in the service accept message, or the UE has included the allowed PDU session status IE in the service request message but the service accept message does not indicate that any user plane resources of any PDU sessions are to be re-established
d. The service request procedure has been initiated in 5GMM-IDLE mode;
e. The user plane resources for PDU sessions have not been set up; and/or
f. The UE is able to perform V2X communication without requesting resources for the V2X communication over a PC5 reference point.

In addition to one of the above events occurring, if no DRB is established from the network (e.g., the radio access network (RAN)), the connection release timer may be started. If the cell changes to a new tracking area that is not present in the registered TAI list due to handover or radio resource control (RRC) re-establishment, then a new mobility registration request may be triggered. As the connection release timer is running, the initiation of the new mobility registration update procedure may be affected, as initiating signaling is not allowed until expiry of the connection release timer or release of the signaling connection. Moreover, if the UE has moved to a different cell and tracking area, or if the UE is encountering lower layer failures, the reception of release of the signaling connection or set up of signaling radio bearer (SRB) may not be possible. As a result, there may be a time delay in signaling, a lack of data, and/or wastage of resources. This may cause challenges for service that may utilize quick data transmission, where the packets may have a smaller size.

Figure 8:
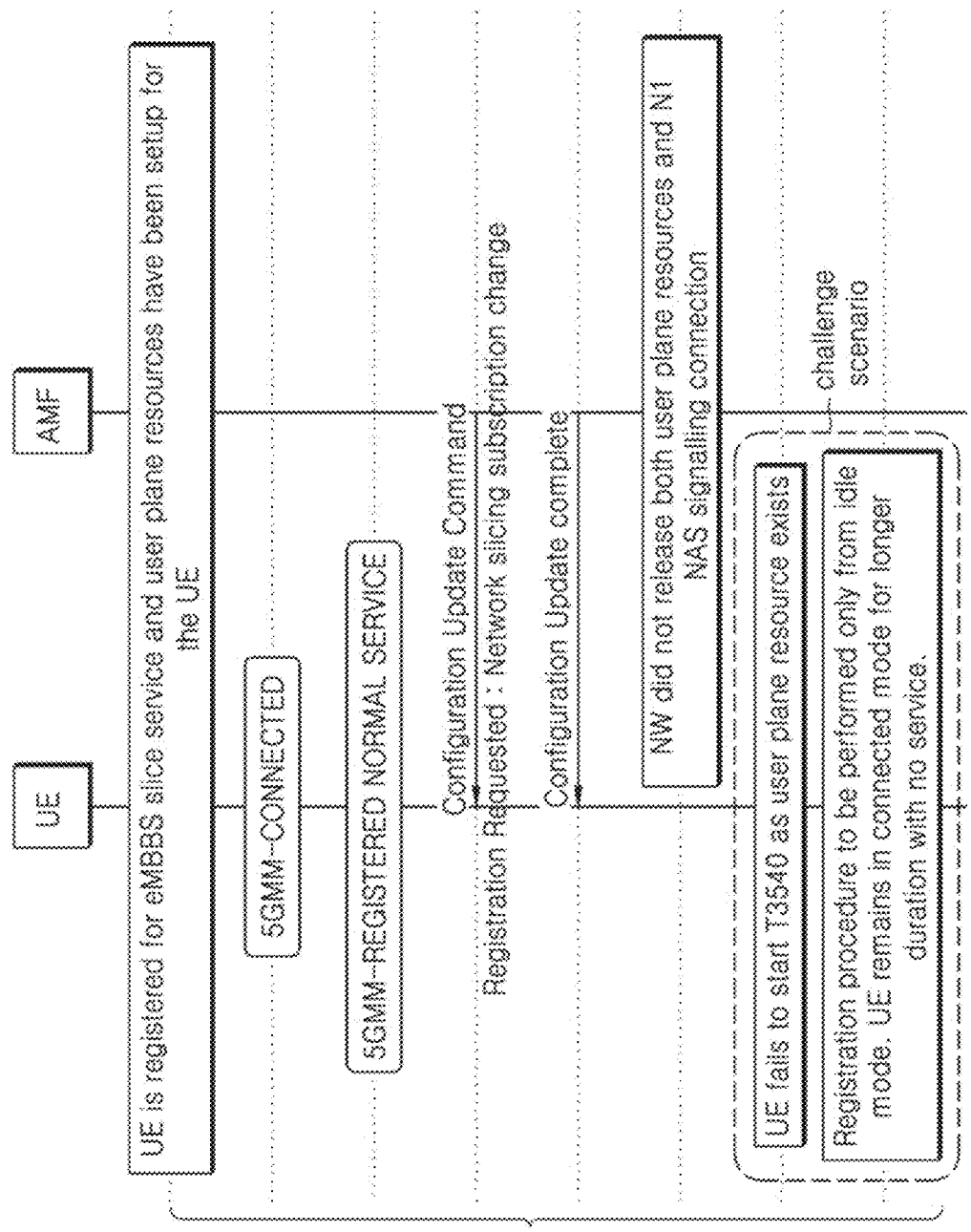
FIG. 8 illustrates a challenge scenario where a UE is stuck in a connected state and when the network has not released the signaling connection.

Scenario 4 Challenge: Releasing a Signaling Connection to Perform the Mobility Registration Procedure FIG. 8 illustrates a challenge scenario where a UE is stuck in a connected state and when the network has not released the signaling connection. For example, the UE may be registered for enhanced mobile broadband slice (eMBBs) service and may have user plane resources setup. Also, the UE may enter the MM states of 5GMM-Connected and 5GMM-Registered.Normal-Service. When the UE receives a configuration update command message, from an access and mobility function (AMF), containing a configuration update indication IE with a registration bit set to "registration requested" due to network slicing subscription change indication, then the UE may perform the mobility registration again after the release of the current N1 NAS signaling connection.

For the UE to release the N1 NAS signaling connection locally, if the network has failed to release the signaling connection, the UE may start the connection release timer if there are no emergency PDU sessions established and if there are no user plane resources for PDU sessions that have been set up as per certain specifications (an example of this is 3GPP specifications). If the network slice subscription has changed, all allowed and configured slices may be erased by the AMF. Therefore, even if there may be DRBs set up, it may not help the UE for data session as the AMF itself may want to release the signaling connection. Due to the UE being registered with user plane resources for the PDU sessions set up and the network failing to release the user plane resources and the signaling connection, the UE may get stalled in the connected state for an indefinite period of time without any service. This issue may also be applicable to dual subscriber identity module (SIM) dual standby (DSDS) devices, and may be more evident in DSDS devices where the UE may miss a DRB release or RRC release when radio frequency (RF) is being used by another stack.

The UE may start the connection release timer upon all of the following conditions being satisfied:

a. The UE receives the configuration update command message having the configuration update indication IE with the registration bit set to "registration requested" and with one or more of the following: i) either new allowed network slice selection assistance information (NSSAI) information, new configured NSSAI information, or both, ii) the network slicing subscription change indication, or iii) no other parameters;
b. The user plane resources for PDU sessions have not been set up; and/or
c. No emergency PDU sessions have been established.

With respect to the first event, if any changes to the allowed NSSAI involve the UE immediately or promptly performing the registration procedure because the changes affect the existing connectivity to network slices, for example, the new single-NSSAI (S-NSSAI), may involve a separate AMF that may not be determinable by the current serving AMF, or the AMF may not determine the allowed NSSAI, or if the changes do not affect the existing connectivity to the network slices because of AMF local policies, the serving AMF may indicate to the UE to perform the registration procedure without including the globally unique AMF ID (GUAMI) or 5G-S-temporary mobile subscriber identity (TMSI) in the access stratum signaling after entering connection management-IDLE (CM-IDLE) state. The AMF may release the NAS signaling connection to the UE to allow to enter CM-IDLE after receiving the acknowledgement from the UE.

If the UE receives an indication to perform the registration procedure without including the GUAMI or 5G-S-TMSI in the access stratum signaling after entering CM-IDLE state, then the UE may delete any stored (old) allowed NSSAI, any associated mapping, and any rejected (old) S-NSSAI.

The UE may initiate the registration procedure with the registration type mobility registration update after the UE enters CM-IDLE state. The UE may include a requested NSSAI with the associated mapping of the requested NSSAI in the registration request message. The UE may also include a requested NSSAI in the access stratum signaling, but no GUAMI.

If there are established PDU sessions associated with emergency services, then the serving AMF may indicate to the UE to perform the registration procedure, however, the AMF may fail to release the signaling connection to the UE. As a result, the UE may only be able to perform the registration procedure after the release of the PDU sessions used for emergency services.

Figure 10:
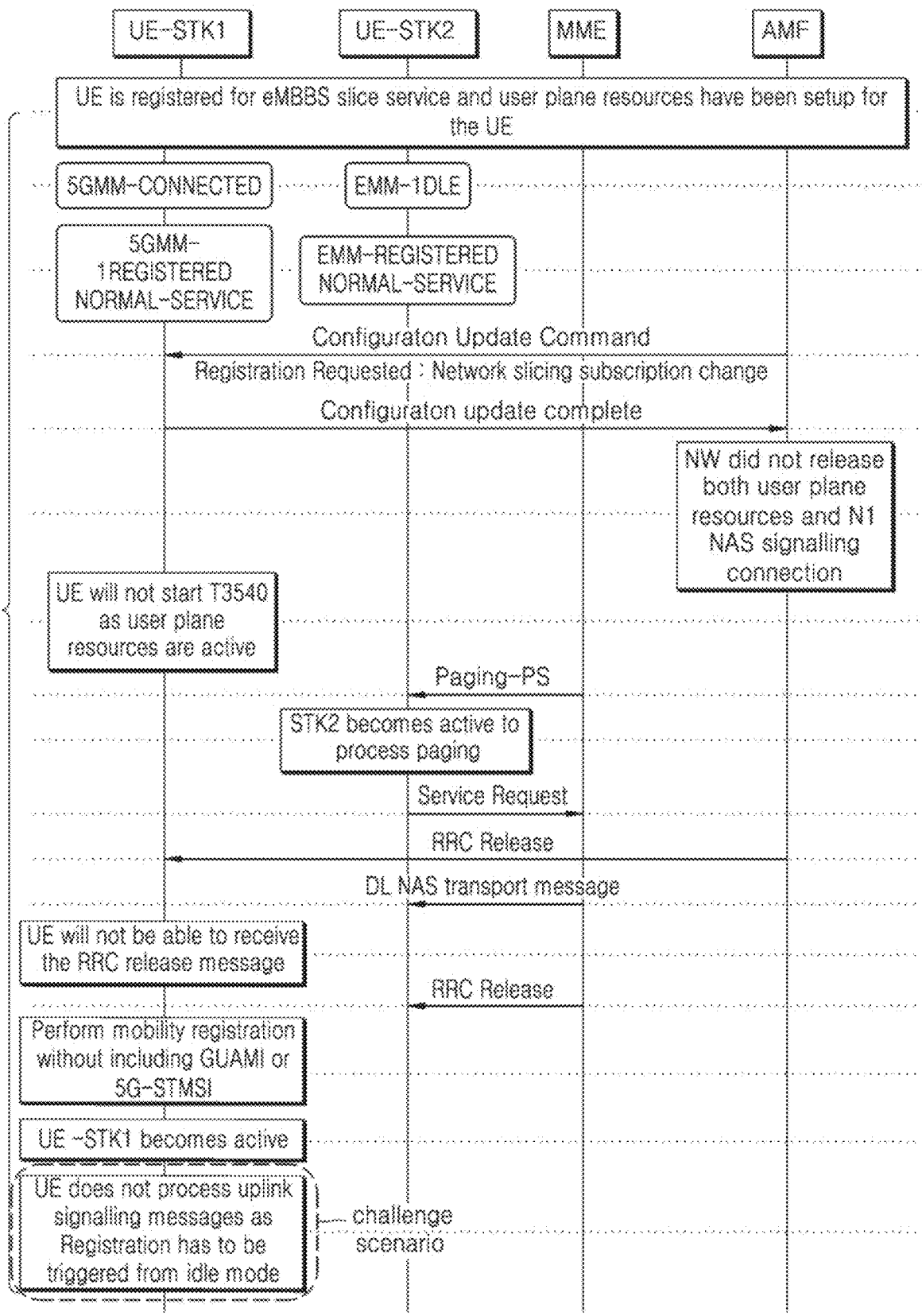
FIG. 10 illustrates a challenge scenario in a dual SIM dual standby (DSDS) device where one of the subscriber identity module application toolkits (STKs) of a UE is stuck in a connected state due to its failure of releasing the signaling connection.

Scenario 5 Challenge: Releasing the Signaling Connection to Perform the Mobility Registration Procedure in a DSDS Device FIG. 10 illustrates a challenge scenario in a dual sim dual standby (DSDS) device where one of the subscriber identity module application toolkits (STKs) of a UE is stuck in a connected state due to its failure to release the signaling connection. At least one of the two STKs of the UE may be registered with the 5G network (also referred to herein as UE-5G STK or UE-STK1), and user plane resources may be established for PDU sessions for enhanced mobile broadband slice (eMBBs). The other STK may be registered with a long-term evolution (LTE) network (e.g., 4G network) and in EMM-IDLE state, or may also be registered with the 5G network. The slice subscription for the UE may be updated at the AMF side. The AMF may send to the UE the configuration update command message with the registration request and the network slice subscription changed. The network may fail to release the signaling connection, and due to user plane resources existing, the UE may fail to start the connection release timer (an example of this is T3540). Paging for downlink (DL) short message service (SMS) from a MME may be signaled to the STK with the LTE network (also referred to herein as UE-LTE STK or UE-STK2). The UE-LTE STK may become active and send a service request from idle mode to the MME. The AMF may then send a signaling release indication/message to the UE-5G STK but the UE-5G STK may fail to process the RRC release message from the AMF due to RF tune-away to the UE-LTE STK. Upon the UE-5G STK resuming, the 5G remains in connected mode without performing connection release as it is still waiting for the "connection release" (which was missed due to no RF with UE-5G STK) from the network. As a result, the UE-5G STK may get stalled in connected mode for an indefinite period of time without any service. When the UE-5G STK becomes active, it may not progress with any pending uplink (UL) messages as the mobility registration has still not been performed from 5GMM-IDLE state. For further background understanding, under 3GPP clause TS 23.401 section 5.4.4.4., when a network has requested for registration through the configuration update command (indicating certain configuration changes) containing the configuration update indication IE with the registration bit set to "registration requested," the UE 10 may need to go to idle mode and perform mobility registration without GUAMI or 5G-STMSI. However, the STK1 may be unable to perform the mobility registration without GUAMI or 5G-STMSI after it is active as the connection release message was missed by the STK1 because the STK2 was using the radio receiver and transmitter of the UE at that time. Due to this, uplink signaling, data etc. may not be possible on STK1.

In other challenge scenarios where the UE-LTE STK is replaced by a second UE-5G STK, the second UE-5G STK may perform the same actions as, or similar actions to, the UE-LTE STK as described above.

Figure 12A:
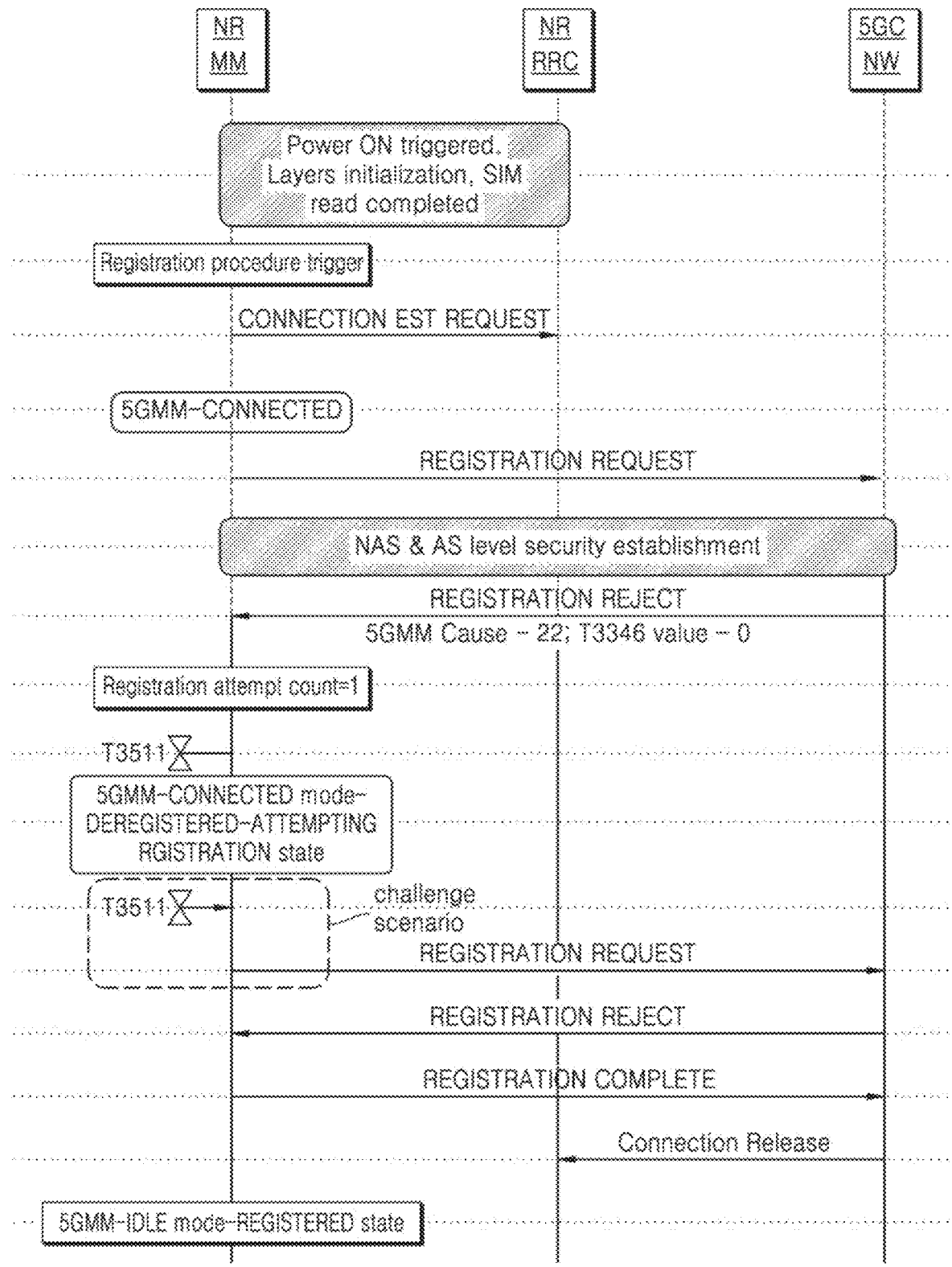
FIGS. 12A and 12B illustrate a challenge scenario where a UE is stuck in a connected state after receiving a registration reject message having an abnormal cause value.
Figure 12B:
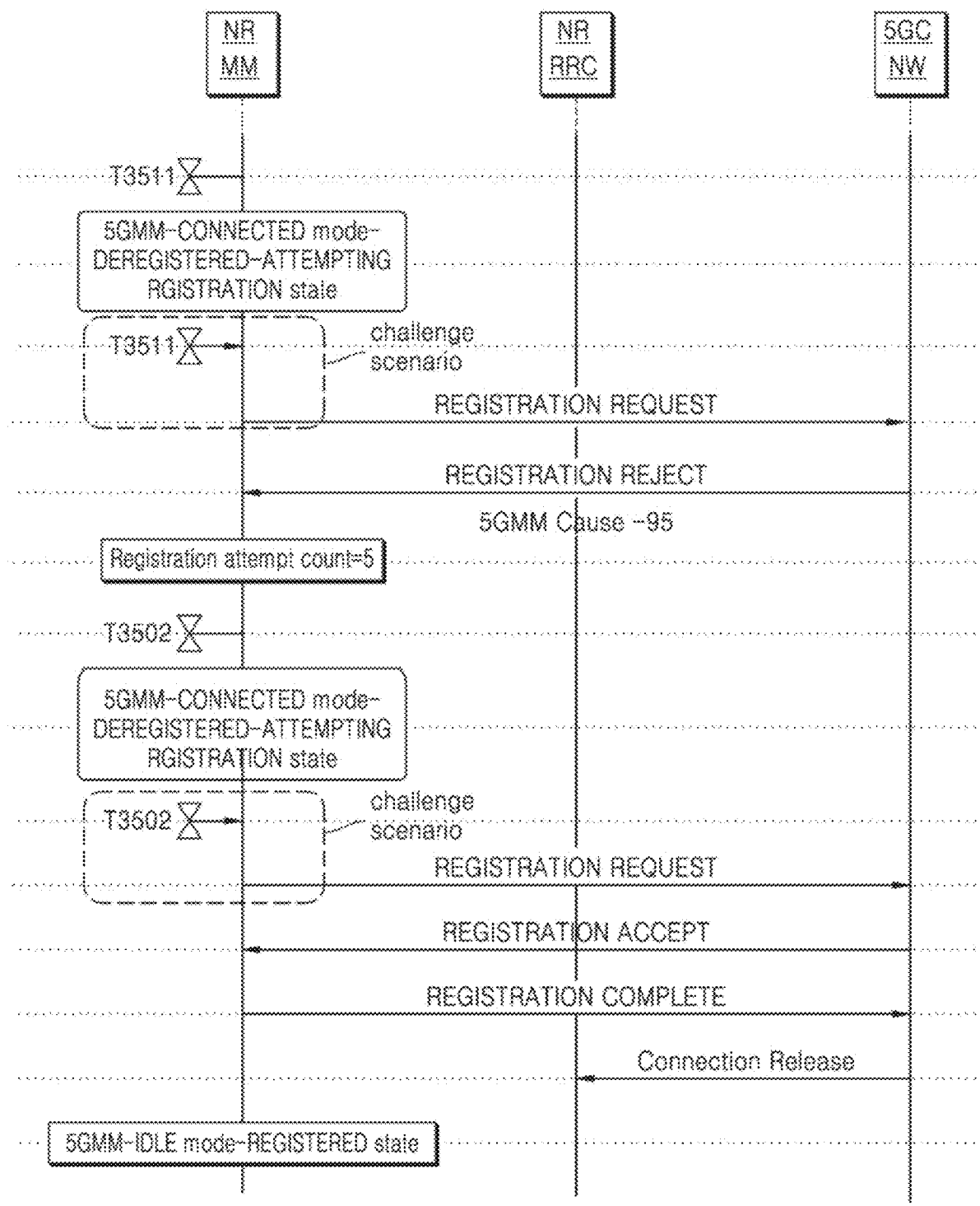

Scenario 6 Challenge: Performing a Mobility Registration Procedure Upon Receiving a Registration Reject Message with an Abnormal Cause FIGS. 12A and 12B illustrate a challenge scenario where a UE is stuck in a connected state after receiving a registration reject message having an abnormal cause value. Prior to the UE sending a registration request to the network, a series of basic steps may be followed by the UE, such as powering on of the UE, initialization of the layers, completion of reading the SIM card, triggering of the registration procedure, and establishment of NAS and AS level security. Upon the UE sending a registration request to the network for initial registration, the network may, in response to the registration request, send a registration reject message indicating a rejection of the registration request. The registration reject message may have an abnormal cause value. The timer T3346 value IE may not be included in the registration request message. The UE may determine this situation to be an abnormal case, and following this, the UE may increment a 5G registration attempt counter and increment a first short timer (an example of this is T3511). However, the network may not release the signaling connection. Upon the expiry of the first short timer, the UE may send again a registration request to the network, following which the network may again send a registration reject message having an abnormal cause value, in response to the registration request. The UE may increment the 5G registration attempt counter again, where the process may be repeated until the 5G registration attempt counter reaches a value equal to or greater than the threshold count. Upon the 5G registration attempt counter reaching this value (e.g., "5"), the UE may start a second short timer (an example of this is T3502) for a specific time period, which may be predetermined or alternatively, given. After the expiry of the second short timer, the UE may send again a registration request to the network, following which the network may send a registration accept message to the UE. When the UE requests registration (through the registration request) and is accepted by the network (through the registration accept), the UE may need to acknowledge this through the "registration complete" message. If after this process there is no data to be exchanged between the UE and the network, the network may then release the connection, upon which the UE may move to 5G idle state. The drawback in this scenario is that once the second short timer is started, the UE could remain in connected mode for a duration longer than the specific time period for which the second short timer runs, during which the UE may not perform any procedures or be able to avail itself of any services.

Figure 14:
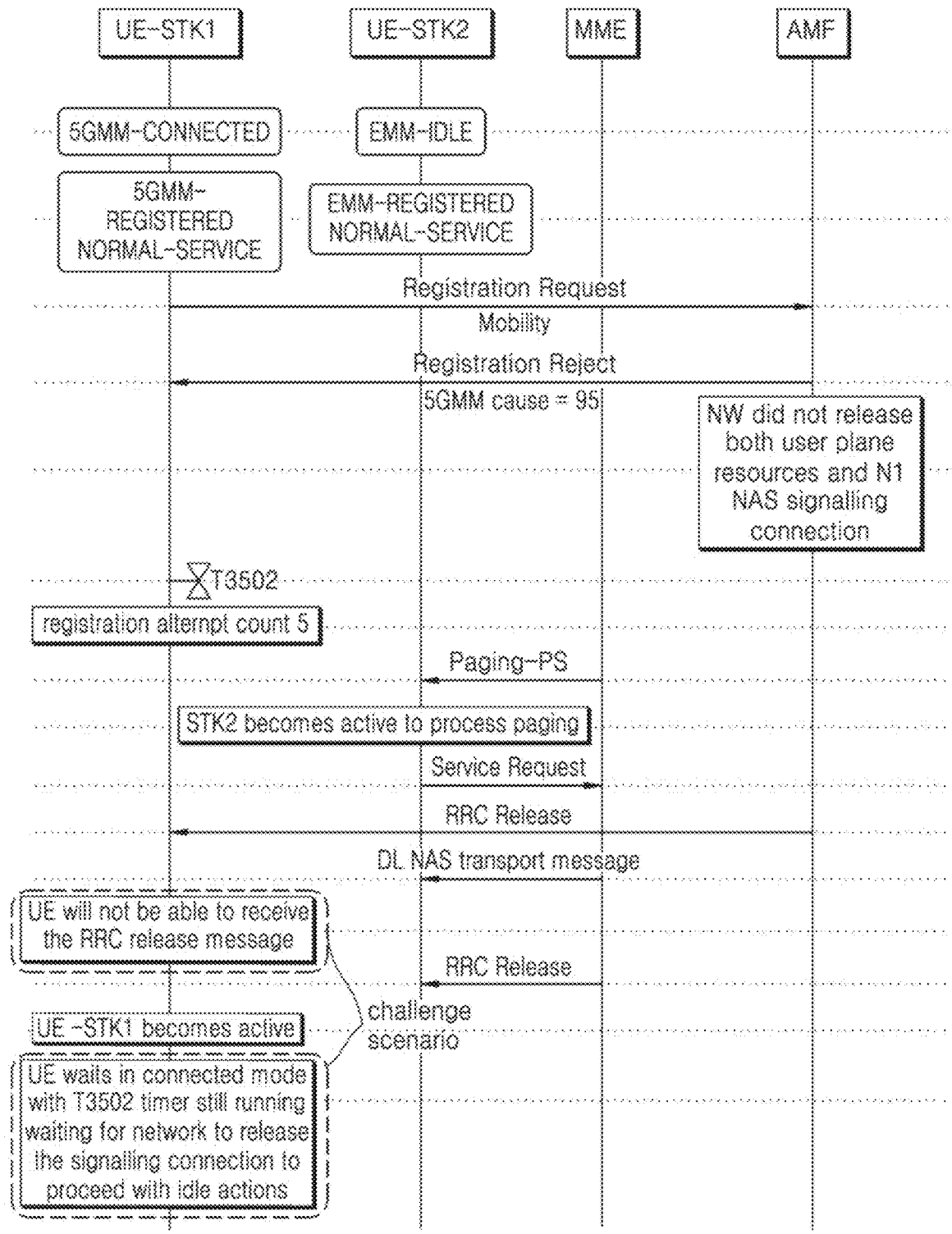
FIG. 14 illustrates a challenge scenario in a DSDS device where after a UE receives a registration reject message having an abnormal cause value, a STK having the 5G network of a UE is stuck in a connected state due to its failure to release the signaling connection.

Scenario 7 Challenge: Performing a Mobility Registration Procedure in a DSDS Device Upon Receiving a Registration Reject Message with an Abnormal Cause FIG. 14 illustrates a challenge scenario in a DSDS device where after a UE receives a registration reject message having an abnormal cause value, the UE is stuck in a connected state due to its failure to release the signaling connection. The UE may be registered with two STKs, with at least one of the two STKs having the 5G network (also referred to herein as UE-5G STK or UE-STK1). The other STK may be registered with the 5G network or the LTE network and in EMM-IDLE state (also referred to herein as UE-LTE STK or UE-STK2). If the UE enters a tracking area that is not present in a registered TAI list, the UE may trigger a mobility registration procedure. The AMF may send to the UE a mobility registration reject message with a 5GMM cause. The network may also fail to release the signaling connection. In response to the mobility registration reject message, the UE may increment the 5G registration attempt counter and start the first short timer (an example of this is T3511), as the 5GMM cause may be an abnormal cause and because the UE may be remaining in connected mode. Once the 5G registration attempt counter reaches a value equal to or greater than the threshold count (e.g., 5), the second short timer (an example of this is T3502) may be started. Paging for DL SMS from MME may be signaled to one of the two STK (e.g., the UE-LTE STK). The STK receiving the paging for DL SMS may become active and send a service request from idle mode. The AMF may then send a signaling release to the UE-5G STK, but the UE-5G STK may fail to process the RRC release message from the AMF due to RF tune-away to the UE-LTE STK. Due to this, the UE may be stalled in connected mode for an indefinite time period without any service. The NAS downlink (DL) transport message is a NAS message that can carry short message service (SMS), position information container etc. The network can send this message after paging the UE, based on which the UE moves to connected state and the network transmits this message to the UE. When the UE-5G STK becomes active, it may not progress with idle procedure actions until it enters idle mode. The UE may continue to remain in connected with the second short timer still running as the UE may be waiting for the network to release the signaling connection. When the abnormal failures relate to the UE-STK1 having the 5G network, the 5G registration attempt counter is incremented for every instance of receiving the registration reject message.

For tracking the abnormal failures relating to the UE-STK2 having the 4G network, an attach attempt counter is incremented for every instance of the attach procedure being rejected with an abnormal reject cause.

The challenges that follow from such scenarios involving NAS signaling may include a delay in resuming data sessions, resource wastage due to breaking and/or making of a connection, keeping the connection without any activity, and/or having the UE stuck in a connected state without any uplink (UL) or downlink (DL) services. Additionally, when the UE is camped in a fake network (a false base station and network that may attack a UE to fetch information regarding the UE or a user), this may lead to drainage of the UE resources through repeated signaling rejects and re-attempts. Prolonged connection of the UE in a connected state may lead to wastage of resources in both the network and UE. There may be extra overhead of signaling, and the delay in data services may be particularly harmful in situations in which critical data is being sent. Devices having dual SIM capabilities may suffer as prolonged connected state in one SIM may hamper the procedures in the other SIM. Embodiments provide systems and methods for overcoming the drawbacks and inefficiencies associated when such scenarios in NAS signaling are encountered.

Embodiments herein disclose methods and systems for completing a registration procedure in a wireless communication network by optimizing or improving the signaling and connection management in a non-access stratum.

Embodiments herein disclose methods and systems for completing a TAU procedure in the wireless communication network.

Embodiments herein disclose methods and systems for locally releasing a signaling connection in the wireless communication network.

Embodiments herein disclose methods and systems for completing a registration procedure when the UE receives a registration reject message with an abnormal cause value.

Embodiments herein and the various features and advantageous details thereof are explained more fully with reference to the non-limiting examples that are illustrated in the accompanying drawings and detailed in the following description. Descriptions of well-known components and processing techniques are omitted so as to not unnecessarily obscure embodiments herein. The examples used herein are intended merely to facilitate an understanding of ways in which embodiments herein may be practiced and to further enable those of skill in the art to practice embodiments herein. Accordingly, the examples should not be construed as limiting the scope of embodiments herein. According to embodiments, timers discussed herein may correspond to those provided in 3GPP specifications.

Embodiments herein disclose methods and systems to overcome the challenges of various scenarios in NAS signaling. Referring now to FIGS. 1 through 17, where similar reference characters denote corresponding features consistently throughout the figures, there are shown embodiments.

Figure 2:
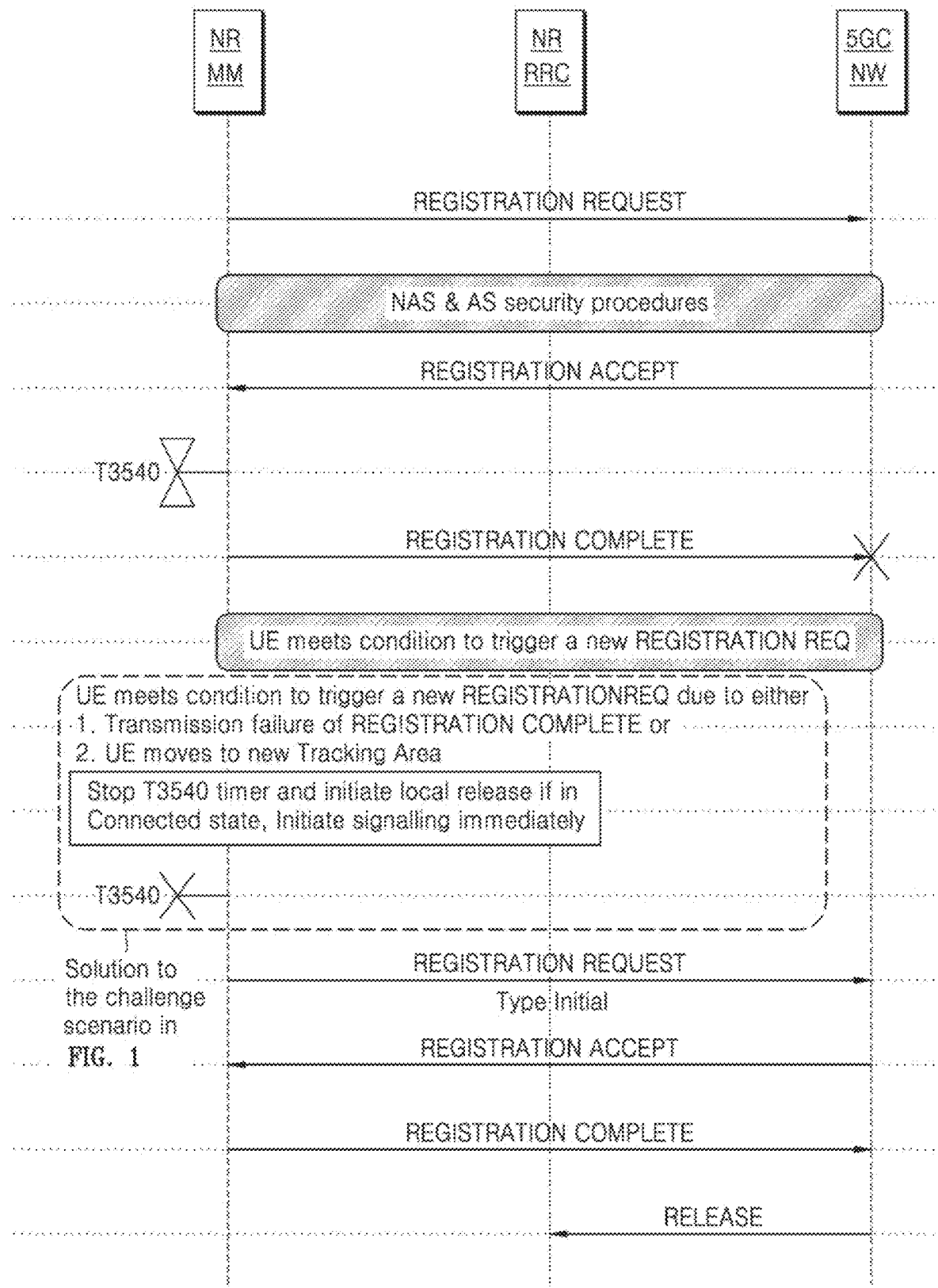
FIG. 2 illustrates a solution to the challenge scenario of FIG. 1 where the UE, upon the transmission failure of the registration complete message due to the TAI change, is unable to perform the registration procedure, according to embodiments as disclosed herein.

Scenario 1 Solution: Completing a Registration Procedure in the 5G Network Upon Transmission Failure of the Registration Complete Message FIG. 2 illustrates a solution to the challenge scenario discussed in connection with FIG. 1 where a UE 10 is unable to perform the registration procedure upon the transmission failure of the registration complete message due to the TAI change, according to embodiments as disclosed herein. As outlined in the scenario 1 challenge, after the UE 10 starts the connection release timer (an example of which is T3540), the UE 10 may then meet at least one of the following conditions to trigger a new registration request:
  a. Cell change (also referred to herein as "movement of the UE 10") to a new tracking area that is not present in a registered tracking area identity (TAI) list;
  b. Cell change to a new tracking area before the completion of the ongoing mobility registration procedure; or
  c. Transmission failure of the registration complete message from the UE 10 to the 5G network.

Once the UE 10 meets the conditions to transmit the new registration request, the UE 10 may then stop the connection release timer and perform a local release of the signaling connection for immediately or promptly initiating the new or subsequent mobility registration procedure. According to embodiments, the UE 10 may stop (e.g., interrupt) the connection release timer before expiration of the connection release timer in response to meeting one or more of the above conditions to trigger a new registration request. According to embodiments, the UE 10 may perform a new registration in response to meeting the one or more of the above conditions, the new registration including local release of a current signaling connection (e.g., if the UE 10 is in a connected state) and/or transmission of a new registration request message.

Figure 3A:
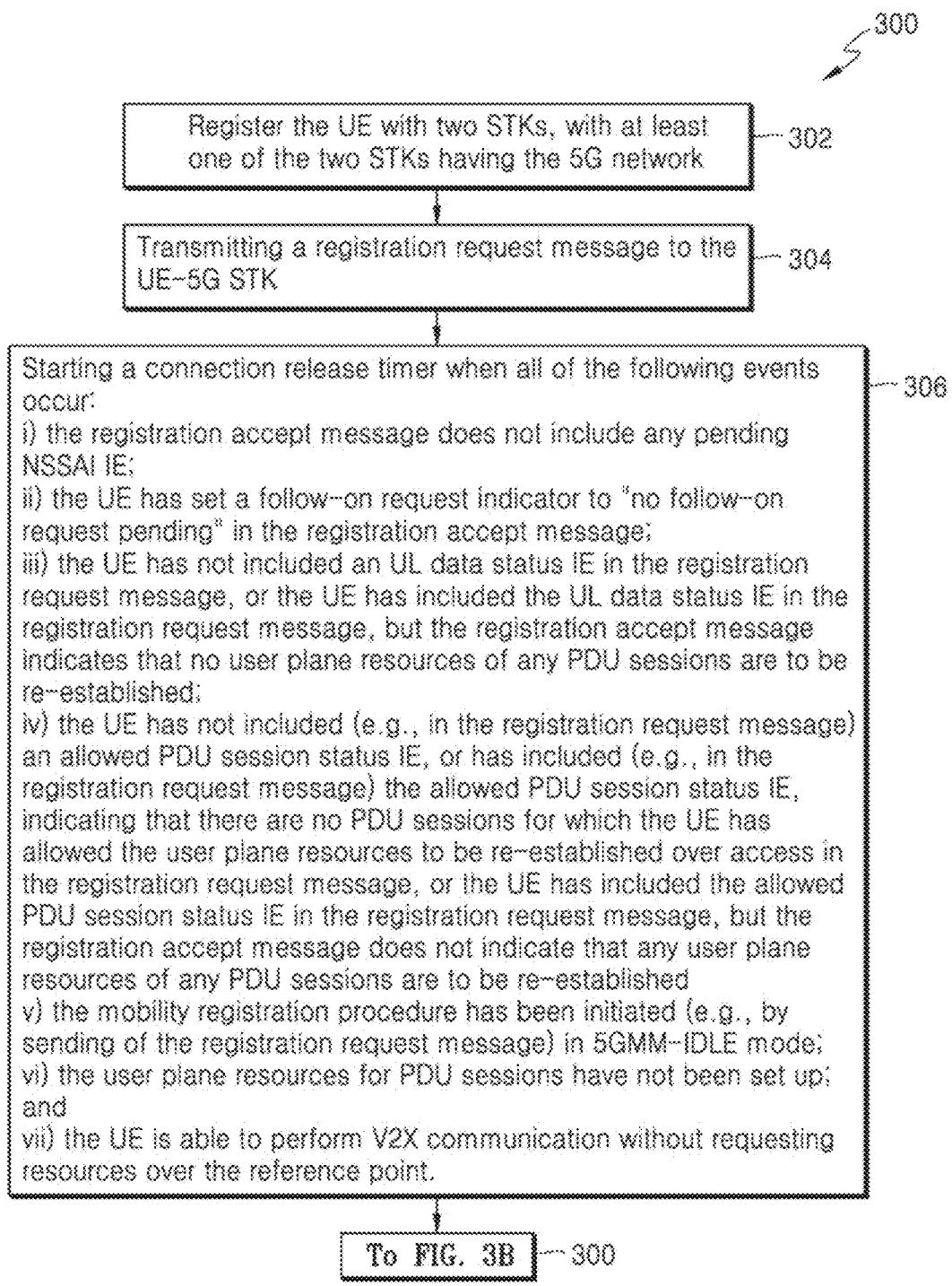
FIGS. 3A and 3B illustrate a method for completing the mobility registration procedure in a DSDS device, upon transmission failure of the registration complete message, according to embodiments as disclosed herein.
Figure 3B:
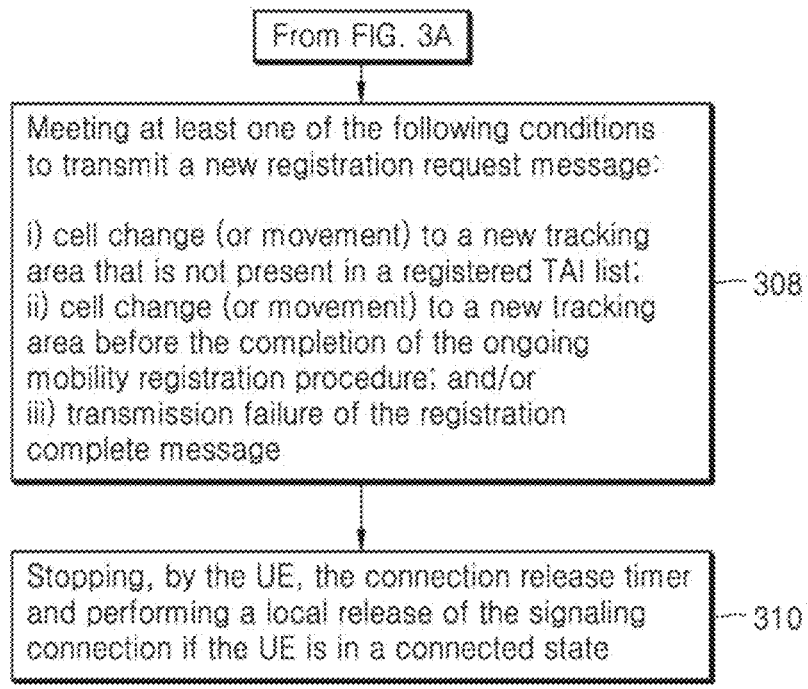

In embodiments, as illustrated by the method 300 in FIGS. 3A and 3B for completing the registration procedure in the 5G network in a DSDS device upon a transmission failure of the registration complete message, the following operations may be performed, according to embodiments as disclosed herein. While the UE 10 is described as being a DSDS device in the context of performing the method 300, similar operations (e.g., operations 304-310) may be performed by the UE 10 in embodiments in which the UE 10 is not a DSDS device. At operation 302, the UE 10 may be registered with two STKs, wherein at least one of the two STKs has (e.g., is connected to) the 5G network. At operation 304, the UE 10 may transmit the registration request message to (e.g., to the 5G network via) the STK having the 5G network (also referred to herein as UE-5G STK). At operation 306, the UE 10 may start the connection release timer upon the occurrence of all the events that follow:

a. The registration accept message does not include any pending NSSAI IE;
b. The UE 10 has set a follow-on request indicator to "No follow-on request pending" in the registration request message;
c. The UE 10 has not included an uplink (UL) data status IE in the registration request message, or the UE 10 has included the UL data status IE in the registration request message but the registration accept message indicates that no user plane resources of any PDU sessions are to be re-established;
d. The UE 10 has not included (e.g., in the registration request message) an allowed PDU session status IE, has included (e.g., in the registration request message) the allowed PDU session status IE indicating that there are no PDU sessions for which the UE 10 has allowed the user plane resources to be re-established over access (an example of this is 3GPP access) in the registration request message, or the UE 10 has included the allowed PDU session status IE in the registration request message but the registration accept message does not indicate that any user plane resources of any PDU sessions are to be re-established;
e. The mobility registration procedure has been initiated (e.g., by the sending of the registration request message) in 5GMM-IDLE mode;
f. The user plane resources for PDU sessions have not been set up; and/or
g. The UE 10 is able to perform V2X communication without requesting resources for the V2X communication over the reference point.

After starting the connection release timer, at operation 308, the UE 10 may complete the registration procedure in the DSDS device after meeting at least one of the following conditions to transmit the new registration request message:
a. Cell change (or movement) to a new tracking area that is not present in a registered tracking area identity (TAI) list;
b. Cell change (or movement) to a new tracking area before the completion of the ongoing mobility registration procedure; and/or
c. Transmission failure of the registration complete message.

At operation 310, the UE 10 may then stop the connection release timer and initiate signaling (e.g., to perform a local release of the signaling connection for immediately or promptly initiating the new or subsequent mobility registration procedure). According to embodiments, the UE 10 may stop (e.g., interrupt) the connection release timer before expiration of the connection release timer in response to meeting one or more of the above conditions to transmit a new registration request. According to embodiments, the UE 10 may perform a new registration in response to meeting the one or more of the above conditions, the new registration including local release of a current signaling connection (e.g., if the UE 10 is in a connected state) and/or transmission of a new registration request message.

Figure 4:
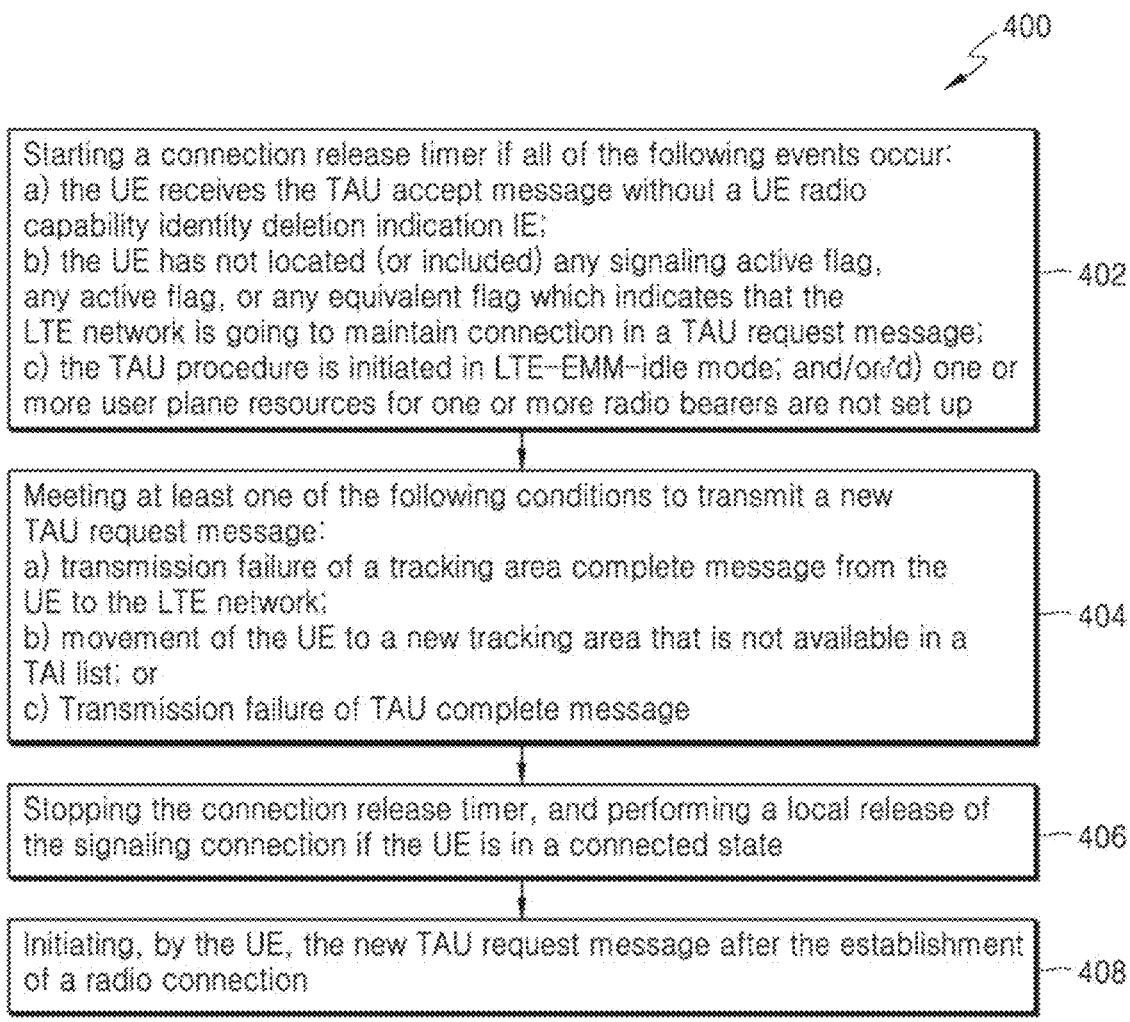
FIG. 4 illustrates a method for completing a TAU procedure when a connection release timer is still running due to a previous TAU procedure, according to embodiments as disclosed herein.

Scenario 2 Solution: Completing a Tracking Area Update (TAU) Procedure when a Connection Release Timer is Running Due to a Previous TAU Procedure In order to overcome the impact of the initiation of the TAU procedure or combined TAU procedure, the following operations in method 400, as illustrated in FIG. 4, may be performed. At operation 402, the UE 10 may start the connection release timer if all of the following events occur:
a. The UE receives the TAU accept message without a UE radio capability identity deletion indication IE;
b. The UE has not located (or included) any signaling active flag, any active flag, or any equivalent flag which indicates that the LTE network (e.g., 4G network) is going to maintain connection in a TAU request message;
c. The TAU procedure is initiated in LTE-EMM-idle mode (e.g., 4G EMM-idle mode); and
d. One or more user plane resources for one or more radio bearers are not set up.

At operation 404, the UE may transmit a new TAU request message if one of the following conditions are met:
a. A cell change (or movement) to a new tracking area that is not present in the registered TAI list;
b. A cell change (or movement) to a new tracking area before the completion of the ongoing TAU procedure; or
c. A transmission failure of the TAU complete message, due to which the UE 10 may re-initiate the TAU procedure.

At operation 406, the UE may stop the connection release timer (e.g., in response to meeting one of the above conditions), and perform a local release of the signaling connection if the UE is in a connected state (e.g., in response to meeting one of the above conditions). At operation 408, the UE may then initiate the new TAU request message after the establishment of a radio connection (e.g., in response to meeting one of the above conditions). According to embodiments, the UE 10 may stop (e.g., interrupt) the connection release timer before expiration of the connection release timer in response to meeting one of the above conditions. According to embodiments, the UE 10 may perform a new registration in response to meeting the one or more of the above conditions, the new registration including local release of a current signaling connection (e.g., if the UE 10 is in a connected state) and/or transmission of a new TAU request message. According to embodiments, the connection release timer is T3440.

In embodiments, upon an indication from the lower layers that the one or more user plane resources for the one or more radio bearers are set up, the UE 10 may stop the connection release timer and send uplink (UL) signaling via the existing NAS signaling connection or user data via the one or more user plane resources for the one or more radio bearers. If the UL signaling is for CS fallback for emergency call, or for establishing a packet data network (PDN) connection for emergency bearer services, the UE 10 may send the UP signaling via the existing NAS signaling connection. If the UE 10 receives a detach request message, the UE 10 may stop the connection release timer and may respond to the network initiated detach.

In embodiments, if the UE 10 receives a request from upper layers to send NAS signaling not associated with establishing either a CS emergency call or a PDN connection for emergency bearer services, the UE 10 may wait for the local release of the established NAS signaling connection upon the expiry or stopping of the connection release timer. If the UE 10 receives a request from the upper layers to establish a CS emergency call or a PDN connection for emergency bearer services, the UE 10 may stop the connection release timer and may locally release the NAS signaling connection. If the UE 10 receives an EPS (evolved packet system) Session Management (ESM) data transport message, as an implementation option, the UE 10 may reset and restart the connection release timer. If the UE 10 receives a DL NAS transport message or a DL generic NAS transport message, the UE, which may be EMM-registered without PDN connection, the UE 10 may stop the connection release timer and may send UL signaling via the existing signaling connection. If the UE 10 receives an activate default EPS bearer context request message, a modify EPS bearer context request message, a deactivate EPS bearer context request message, a DL NAS transport message or a DL generic NAS transport message, and if the UE 10 is using a control plane cellular internet of things (CIoT) EPS optimization, the UE 10 may stop the connection release timer and may send the UL signaling via the existing signaling connection.

In embodiments, the UE 10, upon receiving a request from upper layers to send NAS signaling not associated with establishing a PDN connection for emergency bearer services, the UE 10 may wait for the local release of the established NAS signaling connection upon expiry or stopping of the connection release timer. If the UE 10 receives a request from the upper layers to establish a PDN connection for emergency bearer services, the UE 10 may stop the connection release timer and locally release the NAS signaling connection.

In embodiments, upon an indication from the lower layers that the radio release control (RRC) connection has been released, the UE 10 may stop the connection release timer and perform a new attach procedure. If the UE 10 receives a request from the upper layers to establish a PDN connection for emergency bearer services, the UE 10 may stop the connection release timer and locally release the NAS signaling connection.

In embodiments, upon receiving a request from the upper layers to send NAS signaling not associated with establishing either a CS emergency call or a PDN connection for emergency bearer services, the UE 10 may wait for the local release of the established NAS signaling connection upon expiry or stopping of the connection release timer. If the UE 10 receives a request from the upper layers to establish a CS emergency call or a PDN connection for emergency bearer services, the UE 10 may stop the connection release timer and locally release the NAS signaling connection.

In embodiments, if there is an indication from the lower layers that the user plane radio bearers are set up or upon receiving a request from the upper layers to send NAS signaling not associated with the ESM data transport message, the UE 10 may stop the connection release timer. The UE 10 may also not send ESM data transport message until the expiry or stopping of the connection release timer.

Figure 6:
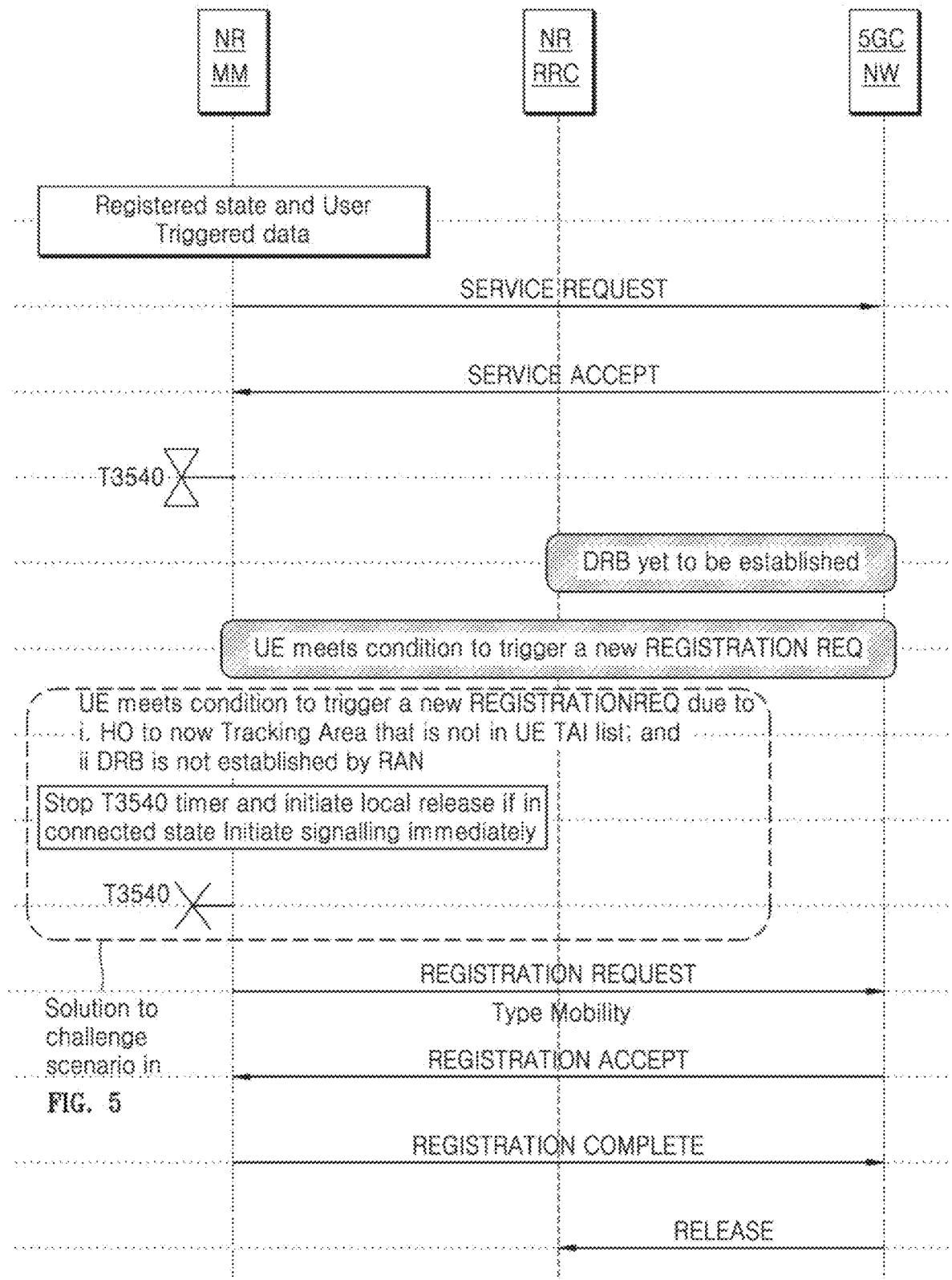
FIG. 6 illustrates a solution to the challenge scenario illustrated in FIG. 5 where the UE is unable to perform the mobility registration procedure receiving the service accept message and before the establishment of the data radio bearer (DRB), according to embodiments as disclosed herein.

Scenario 3 Solution: Completing a Mobility Registration Procedure Upon Receiving a Service Accept Message and Before Establishment of a Data Radio Bearer FIG. 6 illustrates a solution to the challenge scenario illustrated in FIG. 5 where the UE 10 is unable to perform the mobility registration procedure upon receiving a service accept message and before the establishment of a data radio bearer (DRB), according to embodiments as disclosed herein. After the UE 10 starts the connection release timer, upon the occurrence of the one or more events as outlined in the paragraph describing the challenge in the third scenario, the UE 10 may meet at least one of the following conditions to trigger a new Mobility Registration request:
 a. changing of a cell to a new tracking area that is not present in a registered TAI list due to handover; and
 b. a DRB is not established by the network (an example of which is radio access network (RAN)).

Upon meeting the above conditions, the UE 10 may stop the connection release timer and initiate signaling immediately or promptly (e.g., to perform a local release of the signaling connection for initiating the new or subsequent mobility registration procedure). According to embodiments, the UE 10 may stop (e.g., interrupt) the connection release timer before expiration of the connection release timer in response to meeting one or more of the above conditions to trigger a new Mobility Registration request. According to embodiments, the UE 10 may perform a new registration in response to meeting the one or more of the above conditions, the new registration including local release of a current signaling connection (e.g., if the UE 10 is in a connected state) and/or transmission of a new registration request message.

Figure 7:
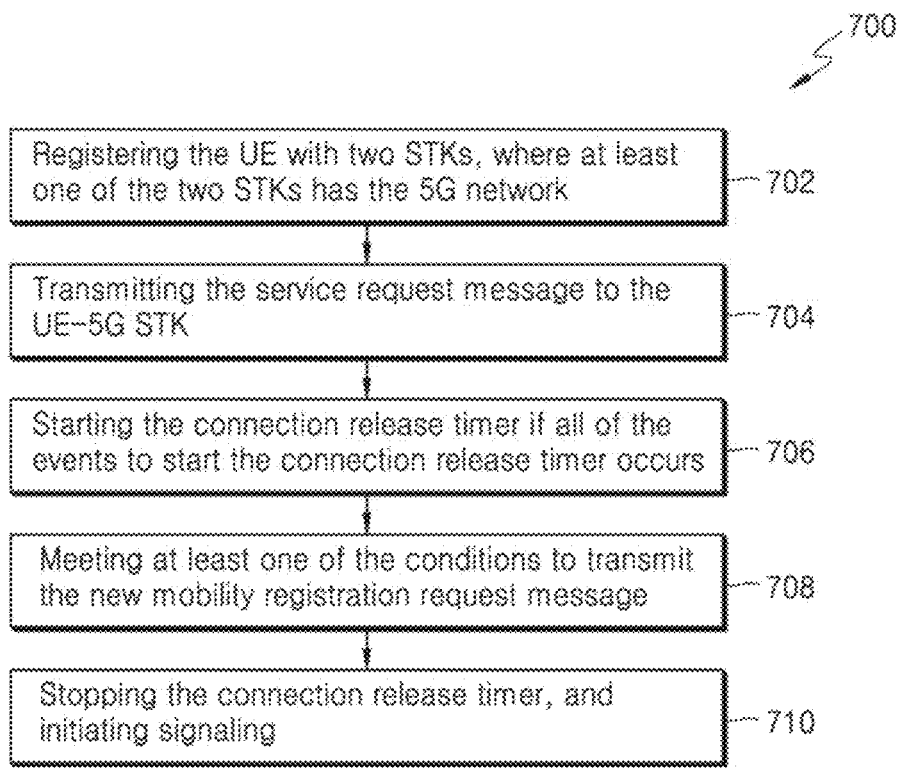
FIG. 7 illustrates a method for completing the registration procedure in a DSDS device, upon receiving the service accept message, according to embodiments as disclosed herein.

In embodiments, as illustrated by method 700 in FIG. 7, for completing the registration procedure in the 5G network in a DSDS device, the following operations may be performed. While the UE 10 is described as being a DSDS device in the context of performing the method 700, similar operations (e.g., operations 704-710) may be performed by the UE 10 in embodiments in which the UE 10 is not a DSDS device. At operation 702, the UE 10 may register with two STKs, where one of the two STKs has the 5G network. At operation 704, the UE 10 may transmit the service request message to the UE-5G STK. At operation 706, the UE 10 may start the connection release timer on all of the following conditions being satisfied:
 a. The UE 10 receives the service accept message from the network;
 b. The UE 10 did not set (e.g., in the service request message) the service type IE to "signaling" or"high priority access," the UE 10 has not included the UL data status IE in the service request message, or the UE 10 has included the UL data status IE in the service request message but the service accept message indicates that no user plane resources of any PDU sessions are to be re-established;
 c. The UE 10 has not included (e.g., in the service request message) the allowed PDU session status IE, has included the allowed PDU session status IE (e.g., in the service request message) indicating there are no PDU sessions for which the UE 10 has allowed the user plane resources to be re-established over access (an example of this is 3GPP access) in the service accept message, or the UE 10 has included the allowed PDU session status IE in the service request message but the service accept message does not indicate that any user plane resources of any PDU sessions are to be re-established
 d. The service request procedure has been initiated in 5GMM-IDLE mode;
 e. The user plane resources for PDU sessions have not been set up; and/or
 f. The UE 10 is able to perform V2X communication without requesting resources for the V2X communication over the reference point.

After starting the connection release timer, at operation 708, the UE 10 may meet at least one of the following conditions to transmit the new Mobility Registration request message:
 a. the service request is accepted and no DRB is established from the network; and/or
 b. handover or RRC re-establishment to a new tracking area that is not in the UE 10 TAI list.

At operation 710, the UE 10 may then stop the connection release timer and initiate signaling (e.g., to perform a local release of the signaling connection for immediately or promptly initiating the new or subsequent mobility registration procedure). According to embodiments, the UE 10 may stop (e.g., interrupt) the connection release timer before expiration of the connection release timer in response to meeting one or more of the above conditions to transmit a new Mobility Registration request message. According to embodiments, the UE 10 may perform a new registration in response to meeting the one or more of the above conditions, the new registration including local release of a current signaling connection (e.g., if the UE 10 is in a connected state) and/or transmission of a new service request message.

Figure 9:
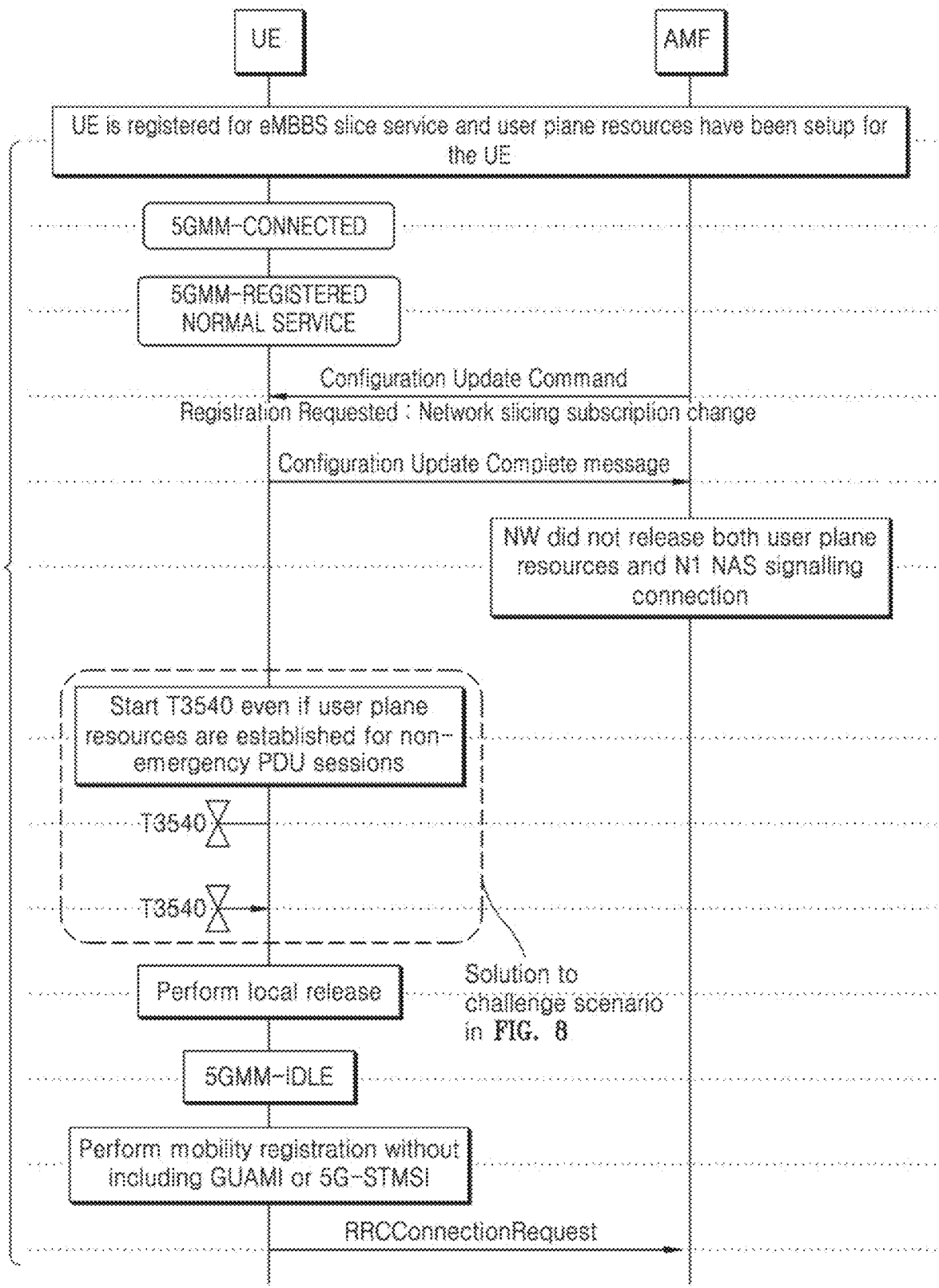
FIG. 9 illustrates a solution to the challenge scenario illustrated in FIG. 8 where the UE is stuck in the connected state and when the network has not released the signaling connection, according to embodiments as disclosed herein.

Scenario 4 Solution: Releasing a Signaling Connection to Perform the Mobility Registration Procedure FIG. 9 illustrates a solution to the challenge scenario illustrated in FIG. 8 where the UE 10 is stuck in the connected state and when the network has not released the signaling connection, according to embodiments as disclosed herein. In order to prevent the UE 10 from being stalled in the connected state for an indefinite period of time, or reduce the occurrence thereof, and when the network has failed to release the signaling connection, the UE 10 may be allowed to start the connection release timer despite user plane resources existing, provided that all of the following events occur:

a. The UE 10 receives the configuration update command, from the AMF, containing the configuration update indication IE with the registration bit set to "registration requested," and the configuration update command includes one or more of the following: i) an allowed NSSAI (e.g., new allowed NSSAI), a configured NSSAI (e.g., new configured NSSAI), or both, ii) the network slicing indication IE with the network slicing subscription change indication set to "network slicing subscription changed," or iii) no other parameters; and/or
   b. No emergency PDU sessions have been established for the UE.

Upon starting the connection release timer, the UE 10 may wait until the expiry of the connection release timer to release the signaling connection. According to embodiments, the UE 10 may be able to override or interrupt conventional protocol (e.g., 3GPP protocol) to start the connection release timer despite the existence of user plane resources. Upon releasing the signaling connection, the UE 10 may then, from 5GMM-IDLE state, perform the mobility registration procedure without GUAMI or 5G-STMSI. Alternatively, the AMF may initiate the release of the signaling connection.

Figure 11:
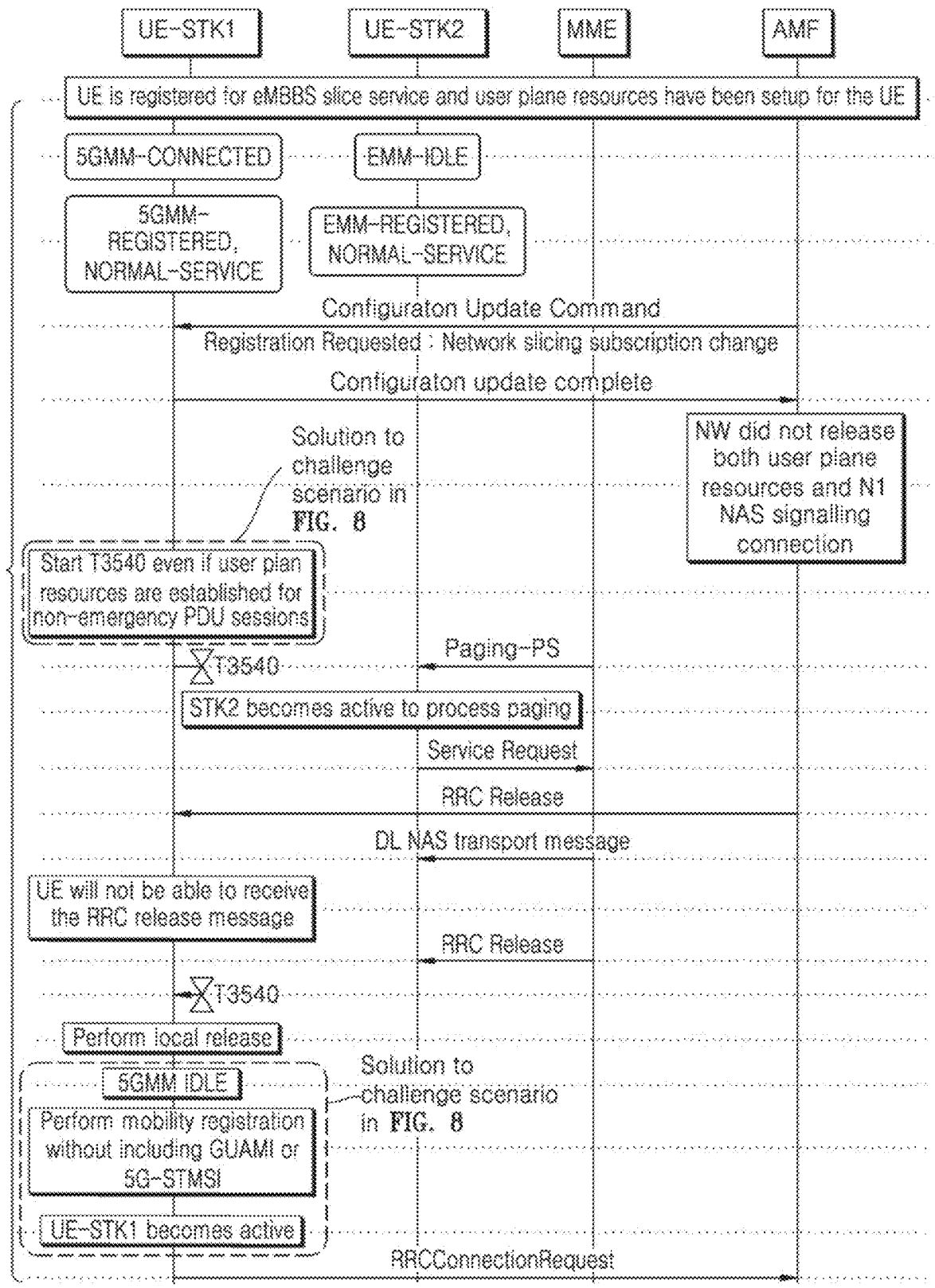
FIG. 11 illustrates a solution to the challenge scenario illustrated in FIG. 10 in the DSDS device where the STK having the 5G network of the UE is in the connected state due to its failure to release the signaling connection, according to embodiments as disclosed herein.

Scenario 5 Solution: Releasing the Signaling Connection to Perform the Mobility Registration Procedure in a DSDS Device FIG. 11 illustrates a solution to the challenge scenario illustrated in FIG. 10 in the DSDS device where the UE-5G STK is in the connected state due to its failure to release the signaling connection, according to embodiments as disclosed herein. The UE-STK1 (which may be registered with the 5G network) in the UE 10 may start the connection release timer even if user plane resources are established for non-emergency PDU sessions. According to embodiments, the UE 10 may be able to override or interrupt conventional protocol (e.g., 3GPP protocol) to start the connection release timer despite the existence of user plane resources. The UE-STK2 (which may be registered with the 5G network or the 4G network) may become active to process one or more triggered services. An example of the triggered process may be a mobile originated or terminated service, such as mobile terminated paging for DL SMS. The UE-STK1 in UE 10 may not be able to receive or process any transmitted command (an example of which is the RRC release message) from the AMF as the service request procedure on the UE-STK2 is ongoing. Upon expiry of the connection release timer and completion of the service request procedure on the UE-STK2, the UE-STK1 in the UE 10 may then become active and perform the local release of the signaling connection. If the connection release timer has expired during the service request procedure on the UE-STK2, the UE-STK1 may remember (or detect) this event and perform the local release after the UE-STK1 becomes active. Then from 5GMM-IDLE state, the UE 10 may perform the mobility registration without GUAMI or 5G-STMSI.

Figure 13A:
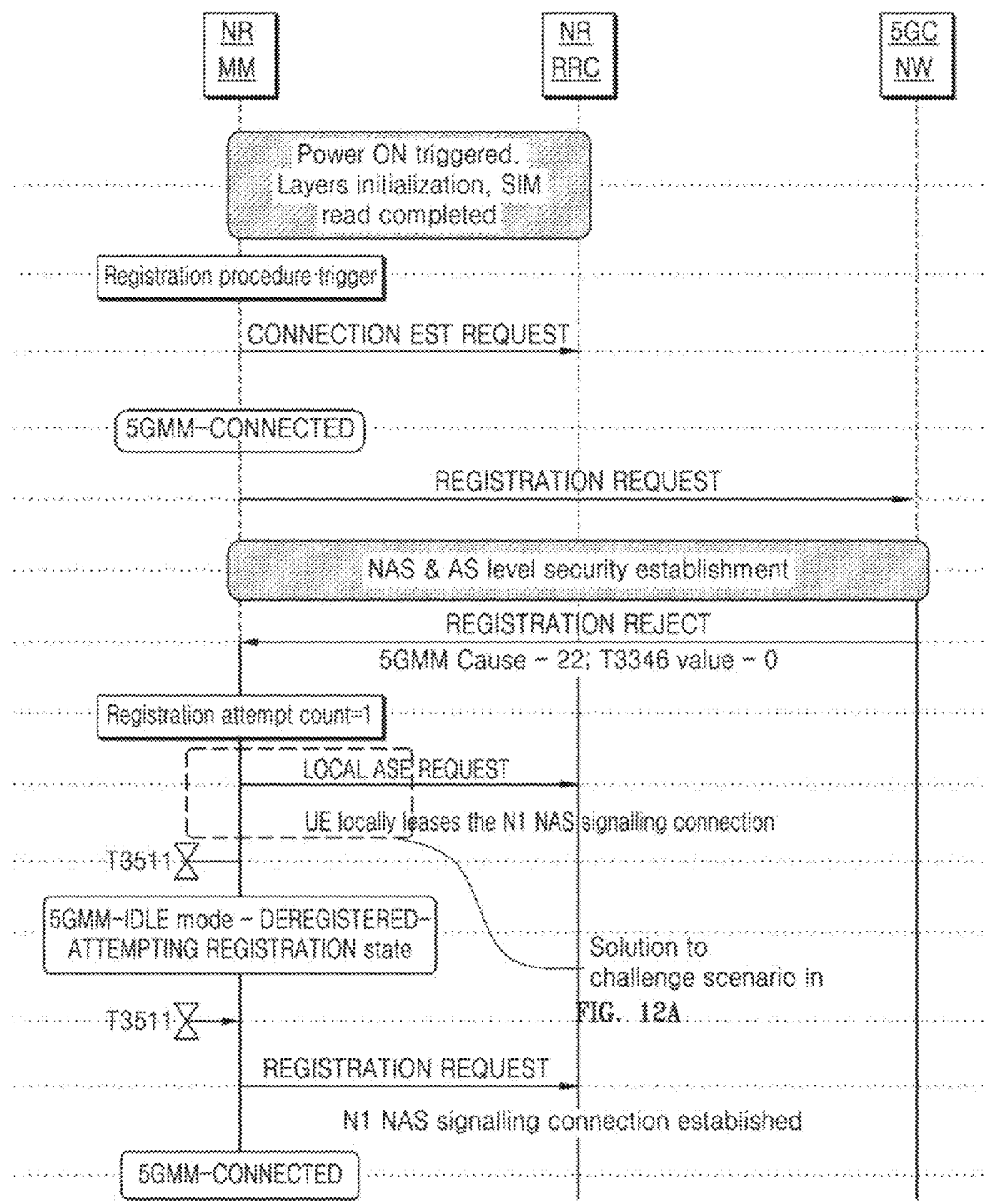
FIGS. 13A and 13B illustrate a solution to the challenge scenario illustrated in FIGS. 12A and 12B where the UE is stuck in the connected state after receiving the registration reject message having the abnormal cause value, according to embodiments as disclosed herein.
Figure 13B:
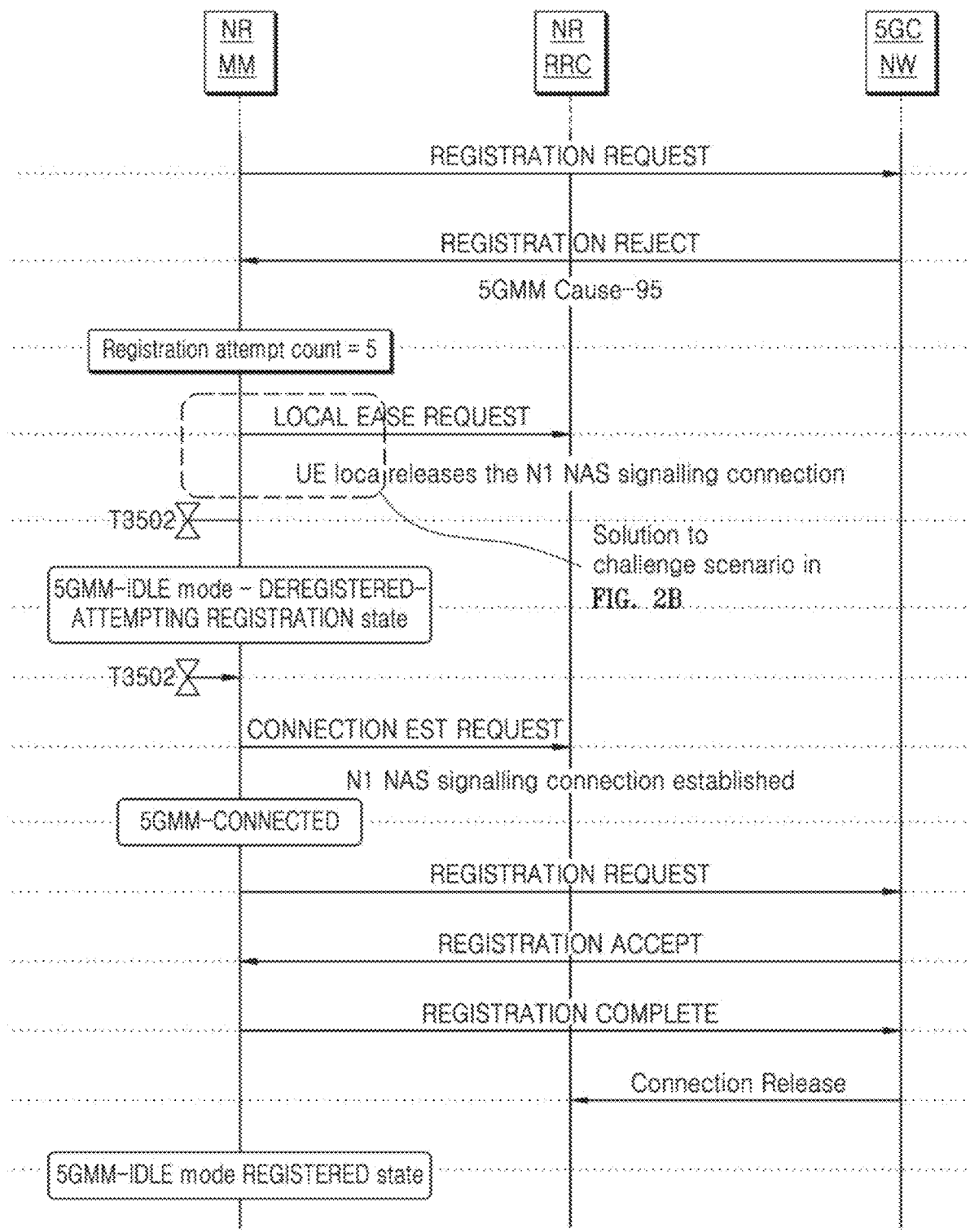

Scenario 6 Solution: Performing a Mobility Registration Procedure Upon Receiving a Registration Reject Message with an Abnormal Cause FIGS. 13A and 13B illustrate a solution to the challenge scenario illustrated in FIGS. 12A-12B where the UE 10 is stuck in the connected state after receiving the registration reject message having the abnormal cause value, according to embodiments as disclosed herein. Once the UE receives the registration reject message, the UE 10 may increment the 5G registration attempt counter. The UE 10 may locally release the signaling connection upon at least one of the following situations occurring:

a. the UE 10 receives the registration reject message having an abnormal cause value and the network does not release the signaling connection; and/or
   b. expiry of the first short timer, wherein the UE 10 may start the first short timer after incrementing the 5G registration attempt counter.

Following the expiry of the first short timer, the next registration procedure may be triggered from 5GMM-IDLE mode. In embodiments, the UE 10 may locally release the signaling connection upon the 5G registration attempt counter reaching a value equal to or greater than the threshold count. The UE 10 may then start the second short timer, and upon expiry of the second short timer, the UE 10 may send a new mobility registration request message.

Figure 15:
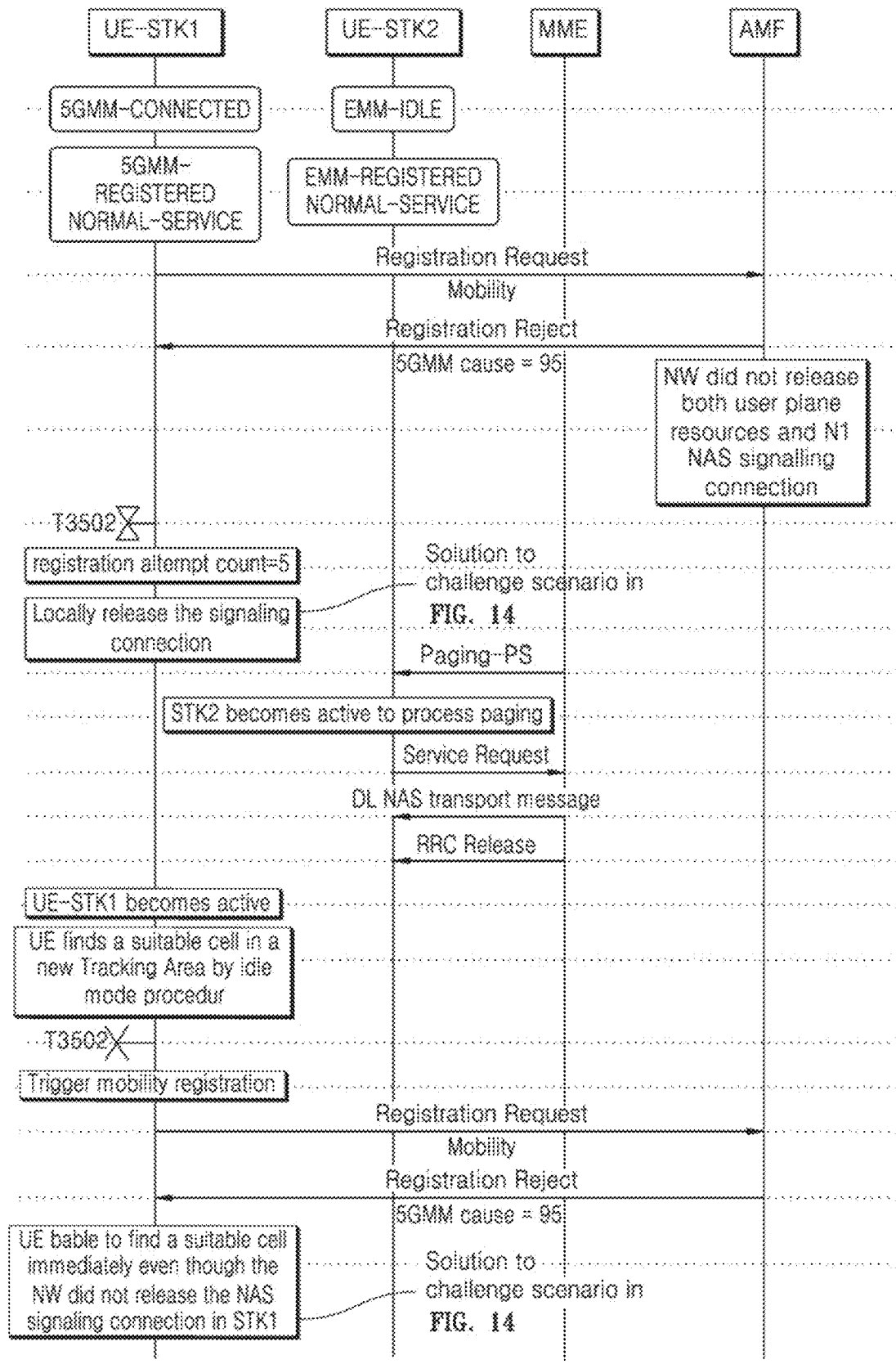
FIG. 15 illustrates a solution to the challenge scenario illustrated in FIG. 14 in the DSDS device where after the UE receives the first registration reject having the abnormal cause value, the STK having the 5G network of the UE is stuck in the connected state due to its failure to release the signaling connection, according to embodiments as disclosed herein.

Scenario 7 Solution: Performing a Mobility Registration Procedure in a DSDS Device Upon Receiving a Registration Reject Message with an Abnormal Cause FIG. 15 illustrates a solution to the challenge scenario in the DSDS device where after the UE 10 receives the first registration reject message having the abnormal cause value, the UE 10 is stuck in the connected state due to its failure to release the signaling connection, according to embodiments as disclosed herein. After (e.g., in response to) receiving the registration reject message from the AMF with a 5GMM cause, and/or the network not releasing the user plane resources and the signaling connection, the UE 10 may start the second short timer. Upon the 5G registration attempt counter reaching a value equal to or greater than the threshold count, the UE 10 may locally release the signaling connection. One of the two STKs may become active to process one more triggered services (an example of this is processing paging for DL SMS), and then send a service request to the MME. The MME may send an RRC release message to the STK that processes the triggered services, which may then result in the completion of a plurality of services associated with this STK. The UE-5G STK may become active, and when the UE 10 finds a new suitable cell in a new tracking area by idle procedure, the UE 10 may stop the second short timer. After the stopping the second short timer, the UE 10 may trigger the mobility registration procedure by sending a registration request to the AMF. The AMF may respond by sending a registration accept message, and the UE 10 may find a suitable service immediately or promptly though the network did not release the signaling connection in the STK having the 5G network. For example, according to embodiments, the UE may perform an immediate or prompt release of the signaling connection upon the value of the 5G registration attempt counter becoming equal to or greater than a threshold count, or after the expiry of the first short timer.

Figure 16:
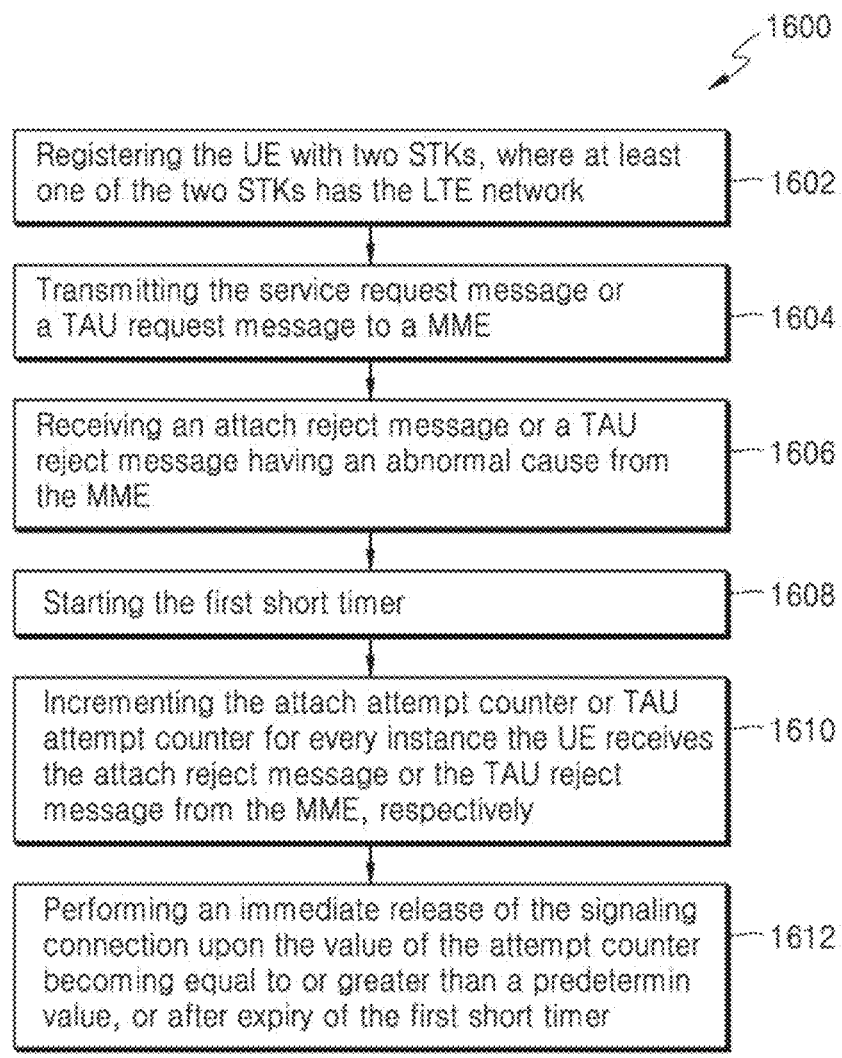
FIG. 16 illustrates a method for releasing the signaling connection upon receiving an attach reject message or a TAU reject message in a DSDS device, according to embodiments as disclosed herein.

FIG. 16 illustrates a method 1600 by which the UE 10 may release the signaling connection after receiving an attach reject message or a TAU reject message in a DSDS device, according to embodiments as disclosed herein. At operation 1602, the UE may be registered with two STKs, with at least one of the two STKs having (e.g., being connected to, registered with, etc.) the LTE network. At operation 1604, the UE may transmit an attach request message or a TAU request message to a MME. At operation 1606, the UE may receive an attach reject message or a TAU reject message having an abnormal cause value from the MME. At operation 1608, the UE may start the first short timer. At operation 1610, the attach attempt counter or the TAU attempt counter may be incremented for every instance that the UE receives the attach reject message or the TAU reject message from the MME, respectively. At operation 1612, the UE may perform an immediate or prompt release of the signaling connection upon the value of the attempt counter becoming equal to or greater than a threshold count (e.g., a predetermined or alternatively, given value), or after the expiry of the first short timer.

It is to be noted that there may be separate counters, associated with each stack (the 5G stack or 4G stack) in the UE, that may be incremented upon receiving the reject message with an abnormal cause value that is associated with the respective stack. For example, in the case of 5G, for every instance of receiving the registration reject message with an abnormal cause value, the 5G registration attempt counter may be incremented. For example, in the case of 4G, for every instance of receiving the attach reject message with an abnormal cause value, the attach attempt counter may be incremented and for every instance of receiving the TAU reject message with an abnormal cause value, the TAU attempt counter may be incremented.

The various actions or operations in method 300, 400, 700, and/or 1600 may be performed in the order presented, in a different order, simultaneously or contemporaneously. Further, in embodiments, some actions or operations listed in FIGS. 3, 4, 7, and/or 16 may be omitted.

Conventional devices and methods for registering a UE with a network (e.g., base station) result in excessive resource consumption (e.g., power, processor, memory, bandwidth, etc.), delay and/or signaling. For example, when the conventional devices experience a signaling failure during registration (e.g., due to cell change), the registration process becomes stalled. In some scenarios, the registration is stalled while the conventional devices wait for expiration of a started timer. In some scenarios, the registration is stalled because conventional devices are unable to start a timer due to an unmet precondition (e.g., network release of user plane resources). Accordingly, in such scenarios, the conventional devices and methods experience the above-mentioned deficiencies.

However, according to embodiments, improved devices and methods are provided for registering a UE with a network. For example, in scenarios in which the registration of the conventional devices would be stalled waiting for timer expiration, the improved devices may stop (e.g., interrupt) the timer before expiration and resume registration. In scenarios in which the registration of the conventional devices would be stalled due to an unmet precondition for starting a timer, the improved devices may override conventional protocols to start the timer despite the unmet precondition. Accordingly, in such scenarios, the improved devices and methods overcome the deficiencies of the conventional devices and methods to at least reduce resource consumption (e.g., power, processor, memory, bandwidth, etc.), delay and/or signaling in registering the UE with the network.

Figure 17:
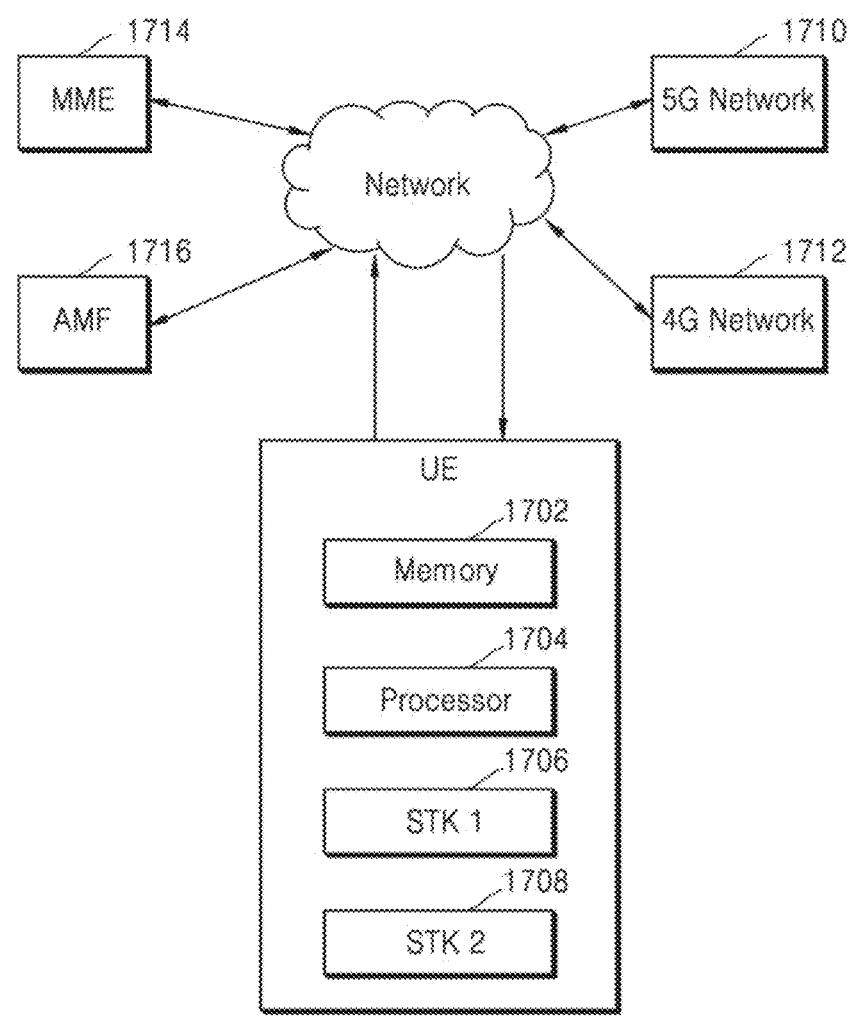
FIG. 17 is a system diagram for enabling optimization or improvement of signaling and connection management in NAS, according to embodiments as disclosed herein.

FIG. 17 illustrates a system 1700 for implementing optimization or improvement of signaling and connection management in NAS. The system 1700 may comprise of the UE 10 and a plurality of connection release timers and short timers. The UE 10 may have a memory 1702 to store a set of instructions, that when executed by a processor 1704, result in the UE performing at least one of the following actions: transmitting a registration request message to the 5G network 1710, transmit a registration complete message to the 5G network 1710, transmit a service request message to the 5G network 1710, receive a registration accept message from the 5G network 1710, receive a service accept message from the 5G network 1710, modify the registration request message (to include at least one of a pending follow-on request, an uplink data status information element (IE), and/or an allowed protocol data unit (PDU) session status IE), modify the service request message (e.g., to include at least one of a service type IE, an uplink data status IE, or an allowed PDU sessions status IE), transmit an attach request message or a TAU message to the LTE network (e.g., the 4G network 1712), receive an attach reject message or a TAU reject message from the LTE network, receive a configuration update command message from the AMF 1716, locally release a signaling connection if the UE is in a connected state, and start/stop the plurality of connection release timers and short timers. According to embodiments, the processor 1704 may implement and/or communicate with the UE-STK1 1706, the UE-STK2 1708, the plurality of connection release timers and/or the plurality of short timers. According to embodiments, the UE 10 may communicate with the 5G network 1710, the 4G network 1712, the MME 1714 and/or the AMF 1716 via one or more network connections (e.g., RRC).

For example, in network of the system 1700, information may be transmitted in various multiple access schemes, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, and OFDM-CDMA.

Each of the 5G network 1710, the 4G network 1712, the MME 1714 and/or the AMF 1716 may be implemented using a corresponding base station. The base station may generally refer to a fixed station that communicates with user equipment and/or other base stations, and may exchange data and control information by communicating with user equipment and/or other base stations. For example, the base station may also be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, or the like. In the present specification, a base station or a cell may be interpreted in a comprehensive sense to indicate some area or function covered by a base station controller (BSC) in CDMA, a Node-B in WCDMA, an eNB in LTE, a gNB or sector (site) in 5G, and the like, and may cover all the various coverage areas such as megacell, macrocell, microcell, picocell, femtocell and relay node, RRH, RU, and small cell communication range. According to embodiments, the 5G network 1710 may refer to a base station implementing 5th generation LTE and/or the 4G network 1712 may refer to a base station implementing 4th generation LTE.

The user equipment 10 may be fixed or mobile and may refer to any device that may communicate with a base station, such as the 5G network 1710, to transmit and receive data and/or control information. For example, the UE 10 may be referred to as a terminal, a terminal equipment, a mobile station (MS), a mobile terminal (MT), a user terminal (UT), a subscriber station (SS), a wireless device, a handheld device, or the like.

According to embodiments, operations described herein as being performed by the UE 10, the processor 1704, the 5G network 1710, the 4G network 1712, the MME 1714, the AMF 1716, the UE-STK1 1706 and/or the UE-STK2 1708 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments disclosed herein may be implemented through at least one software program running on at least one hardware device (an example of this is the UE 10) and performing network management functions to control the network elements.

It is to be noted that the terms "connected mode" and "connected state" as included in the description herein are used interchangeably. It is also to be noted that the various threshold counts for the registration attempt counter may be predetermined or alternatively, given.

It is to be noted that the term "user plane resources" may imply the establishment of user plane radio bearers for the EPS bearers (in LTE) or PDU sessions (in NR) which may be active at the UE 10. However, it is also to be noted that the user plane configuration can be different for different PDU sessions or bearers.

It is to be noted that the term "abnormal cause values" may refer to the reject causes (e.g., REGISTRATION REJECT message and SERVICE REJECT message) as referenced in 3GPP TS 24501 and 3GPP TS 24301.

The foregoing description of specific examples will so fully reveal the general nature of embodiments herein that others may, by applying current knowledge, readily modify and/or adapt for various applications such specific examples without departing from the generic concept, and, therefore, such adaptations and modifications should and are intended to be comprehended within the meaning and range of equivalents of embodiments. It is to be understood that the phraseology or terminology employed herein is for the purpose of description and not of limitation. Therefore, while embodiments herein have been described in terms of examples, those skilled in the art will recognize that the examples disclosed herein may be practiced with modification within the spirit and scope of embodiments as described herein.

We claim:

1. A method for controlling a signaling connection, comprising:
   transmitting, by a user equipment (UE), a registration request message to a network for initiating a registration procedure;
   starting, by the UE, a connection release timer;
   determining, by the UE, whether the registration procedure is not completed; and
   locally releasing, by the UE, the signaling connection before expiration of the connection release timer in response to determining the registration procedure is not completed.

2. The method of claim 1, wherein the determining of whether the registration procedure is not completed comprises determining at least one of:
   transmission failure of a complete message from the UE to the network,
   movement of the UE to a new tracking area before registration procedure is completed, or
   movement of the UE to a new tracking area that is not in a registered tracking area identity (TAI) list.

3. The method of claim 2, wherein,
   the network is a 5G network;
   the complete message is a registration complete message;
   the determining of whether the registration procedure is not completed comprises determining of the transmission failure of the registration complete message from the UE to the 5G network; and
   the connection release timer is T3540.

4. The method of claim 3, wherein
   the UE is a dual sim dual standby (DSDS) device with two subscriber identity module application toolkits (STKs), one of the two STKs being registered with the 5G network; and
   the transmitting the registration request message including transmitting the registration request message via the one of the two STKs registered with the 5G network.

5. The method of claim 2, wherein;
   the network is a 4G network;
   the registration request message is TAU request message;
   the determining of whether the registration procedure is not completed comprises determining of the transmission failure of a TAU complete message from the UE to the 4G network; and
   the connection release timer is T3440.

6. The method of claim 1, the method further comprising:
   stopping, by the UE, the connection release timer.

7. The method of claim 1, wherein, the starting of the connection release timer comprises starting the connection release timer in response to:
  receiving, by the UE, a registration accept message;
  establishing, by the UE, a plurality of user plane resources for a non-emergency protocol data unit (PDU) session; and
  occurrence of an attempt, by the UE, to complete the registration procedure.

8. A method for performing a local release of a signaling connection, comprising:
  transmitting, by a user equipment (UE), a registration request message;
  receiving, by the UE, a registration reject message, the registration reject message including an abnormal cause value; and
  performing, by the UE, the local release of the signaling connection based on an attempt counter having a value equal to or greater than a threshold count, the attempt counter being incremented in response to the receiving of the registration reject message.

9. The method of claim 8, wherein
  the method further comprises starting, by the UE, a first short timer; and
  the performing of the local release includes performing the local release of the signaling connection based on expiration of the first short timer.

10. The method of claim 8, further comprising:
  incrementing a first attempt counter;
  starting a second short timer in response to the first attempt counter having a value equal to or greater than a first threshold count; and
  transmitting a new registration request message upon expiry of the second short timer.

11. The method of claim 8, wherein
  the registration request message is a mobility registration request message;
  the registration reject message is a mobility registration reject message; and
  the UE is a dual sim dual standby (DSDS) device with two subscriber identity module application toolkits (STKs), a first STK among the two STKs being registered with a fifth generation (5G) network.

12. The method of claim 11, wherein,
  the transmitting of the mobility registration request message includes transmitting the mobility registration request message to an access and mobility management function (AMF); and
  the receiving of the mobility registration reject message includes receiving the mobility registration reject message from the AMF.

13. The method of claim 11, the method further comprising:
  starting a second short timer;
  activating a second STK among the two STKs to process one or more triggered services; and
  activating the first STK for triggering a mobility registration procedure after the activating the second STK based on the second short timer being stopped or expiring, the mobility registration procedure being performed without release of the signaling connection of the first STK.

14. The method of claim 11, the method further comprising:
  transmitting, by the UE, a service request message to the 5G network, via the first STK, the service request message initiating a service request procedure;
  receiving, by the UE, a service accept massage-message from the 5G network;
  starting, by the UE, a connection release timer;
  determining whether at least one of following conditions is satisfied:
    changing of a cell to a new tracking area, the new tracking area not being present in a registered tracking area identity (TAI) list due to a handover, and
    a data radio bearer not being established by a radio access network; and
  stopping the connection release timer and initiating signaling, by the UE, in response to determining at least one of the conditions is satisfied.

15. The method of claim 8, wherein
  the attempt counter is a first attempt counter;
  the threshold count is a second threshold count;
  the method further comprises incrementing the first attempt counter; and
  the performing of the local release includes performing the local release of the signaling connection based on the value of the first attempt counter becoming equal to or greater than the second threshold count.

16. The method of claim 8, wherein
  the registration request message is an attach request message or a tracking area update (TAU) request message;
  the registration reject message is an attach reject message or a TAU reject message; and
  the UE is a dual sim dual standby (DSDS) device with two subscriber identity module application toolkits (STKs), a first STK among the two STKs being registered with a fourth generation (4G) network.

17. The method of claim 16, wherein,
  the transmitting of the registration request message includes transmitting, by the UE, the attach request message or the TAU request message to a mobility management entity (MME),
  the receiving of registration reject message includes receiving, by the UE, the attach reject message or the TAU reject message having an abnormal cause from the MME.

18. The method of claim 17, wherein
  the attempt counter is a second attempt counter or a third attempt counter;
  the threshold count is a third threshold count;
  the method further comprises:
    performing one of
      incrementing the second attempt counter in response to receiving the attach reject message, or
      incrementing the third attempt counter in response to receiving the TAU reject message; and
  the performing of the local release includes performing the local release of the signaling connection based on the value of the second attempt counter or the value of the third attempt counter becoming equal to or greater than the third threshold count.

19. The method of claim 16, further comprising:
  starting, by the UE, a third short timer;
  activating a second STK among the two STKs to process one or more triggered services; and
  activating the first STK for triggering an attach procedure or a TAU procedure based on expiry of the third short timer, the attach procedure or the TAU procedure being performed without release of the signaling connection of the first STK.

20. A method for performing a local release of a signaling connection, comprising:

receiving, by a user equipment (UE), a configuration update command message from an access and mobility management function (AMF), the configuration update command message including a configuration update indication information element (IE) with a registration request due to a change in a network slice subscription;

starting, by the UE, a connection release timer; and locally releasing, by the UE, the signaling connection on expiry of the connection release timer.

* * * * *